US012462097B2

(12) United States Patent
Wojcik

(10) Patent No.: US 12,462,097 B2
(45) Date of Patent: Nov. 4, 2025

(54) UTILIZING DYNAMIC INTERFACE ELEMENTS TO IMPROVE USER INTERFACES

(71) Applicant: Microsoft Technology Licensing, LLC, Redmond, WA (US)

(72) Inventor: Brian Michael Wojcik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/760,419

(22) Filed: Jul. 1, 2024

(65) Prior Publication Data
US 2024/0354495 A1   Oct. 24, 2024

Related U.S. Application Data

(63) Continuation of application No. 18/081,458, filed on Dec. 14, 2022, now Pat. No. 12,026,457.

(60) Provisional application No. 63/423,366, filed on Nov. 7, 2022.

(51) Int. Cl.
*G06F 40/174* (2020.01)
*G06F 9/451* (2018.01)
*H04L 9/40* (2022.01)

(52) U.S. Cl.
CPC ........... *G06F 40/174* (2020.01); *G06F 9/451* (2018.02); *H04L 63/102* (2013.01)

(58) Field of Classification Search
CPC ....... G06F 40/174; G06F 9/451; H04L 63/102
See application file for complete search history.

(56) References Cited

U.S. PATENT DOCUMENTS 9,916,190 B1 * 3/2018 Addepalli ............ G06F 3/0482
10,467,622 B1 * 11/2019 Rule ..................... G06F 40/174
(Continued)

FOREIGN PATENT DOCUMENTS

CA   2693710 A1 *  8/2010  .......... G06F 17/243
CN  113343260 A  *  9/2021
(Continued)

OTHER PUBLICATIONS

International Preliminary Report on Patentability received for PCT Application No. PCT/US2023/033682, May 15, 2025, 9 pages.

*Primary Examiner* — Shahid K Khan
(74) *Attorney, Agent, or Firm* — Ray Quinney & Nebeker P.C.; Christopher K. Hallstrom

(57) ABSTRACT

The present disclosure relates to utilizing a dynamic visual elements system to improve operations and interfaces of client applications by detecting when user accounts associated with tokenized or alternative account information are provided for user accounts, generating dynamic visual elements based on the tokenized account information, and intelligently integrating the dynamic visual elements into one or more user interfaces associated with fillable forms. In some implementations, the dynamic visual elements system generates and integrates selectable visual elements and/or visual overlay elements into user interfaces with respect to tokenized user account information in a manner that reduces visual clutter as well as eliminates user confusion regarding tokenized user accounts and their relationship to regular user accounts.

20 Claims, 15 Drawing Sheets

(56) References Cited

U.S. PATENT DOCUMENTS

| | | | | |
|---|---|---|---|---|
| 2014/0258828 A1* | 9/2014 | Lymer | .................. | G06F 40/174 |
| | | | | 715/224 |
| 2017/0076114 A1* | 3/2017 | Rai | ..................... | G06F 21/6254 |
| 2017/0124347 A1* | 5/2017 | Kamata | ................. | G16H 10/60 |
| 2019/0334903 A1* | 10/2019 | Lerner | .................... | H04L 63/10 |
| 2022/0058617 A1* | 2/2022 | Tibrewala | ............. | H04L 67/146 |
| 2023/0087884 A1* | 3/2023 | Anasta | .................... | G06F 21/31 |
| | | | | 726/27 |
| 2023/0105825 A1* | 4/2023 | Agarwal | ................ | G16H 40/20 |
| | | | | 705/2 |

FOREIGN PATENT DOCUMENTS

| | | | | |
|---|---|---|---|---|
| CN | 117296328 A | * | 12/2023 | ........... H04L 65/403 |
| WO | WO-2022185045 A1 | * | 9/2022 | ........... G06F 21/606 |

* cited by examiner

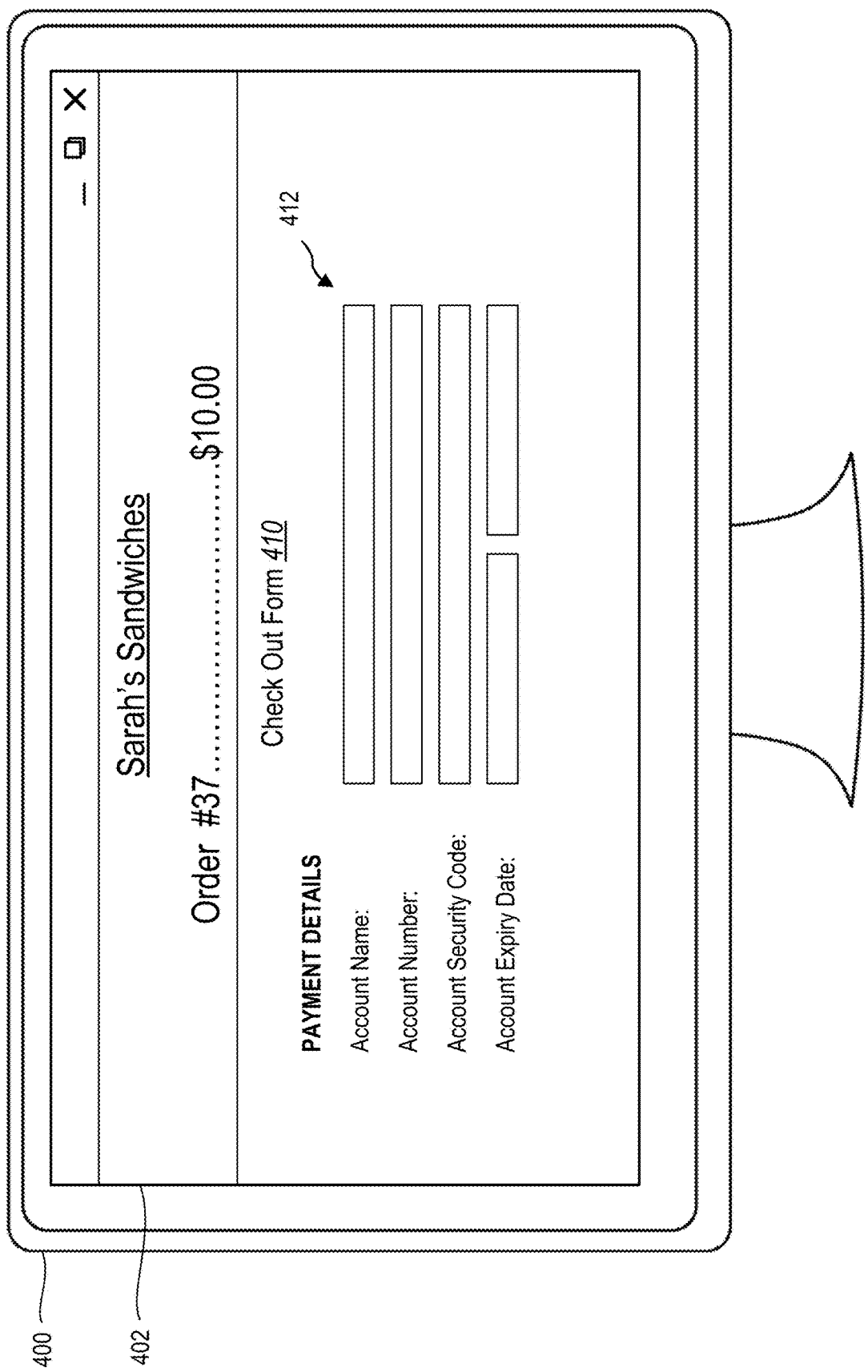

UTILIZING DYNAMIC INTERFACE ELEMENTS TO IMPROVE USER INTERFACES

CROSS-REFERENCE TO RELATED APPLICATIONS

This application is a Continuation of U.S. patent application Ser. No. 18/081,458, filed Dec. 14, 2022 (U.S. Pat. No. 12,026,457 issuing on Jul. 2, 2024), which claims priority to and benefit of U.S. Provisional Patent Application No. 63/423,366, filed Nov. 7, 2022, both of which are incorporated herein by reference in their entireties.

BACKGROUND

Recent years have seen significant advancements in both hardware and software with respect to improving client devices and client applications. For instance, modern computing systems continue to improve client application features and services offered to users. However, some changes create their own set of technical problems and challenges. An example of this can be seen with auto-complete services that assist users in completing particular fillable forms within client applications.

For instance, many existing computer systems provide services that automatically complete fillable forms with pre-saved user information. In some cases, for security reasons, users prefer to use an alias, alternative, or coded user information (e.g., a pseudonym account or email address). While some existing computer systems allow using alias user information, these systems fail to adequately indicate meaningful relationships between their user information and the corresponding alias user information.

To elaborate, many existing computer systems confuse users when they use alias user information but fail to associate it with corresponding user information. This often leads to users believing that the client application is providing incorrect information (e.g., another user's information has been mistakenly used). Thus, while the client application provides the correct alias user information in a fillable form, users believe that the client application is populating the fillable form with inaccurate user information. A result of this confusion is that users often backtrack within the client application, which causes the client device to inefficiently perform needlessly repeated operations.

These and other problems, which are covered below, result in inefficiencies and inaccuracies of existing computing systems with respect to managing and providing related versions of user information within client applications.

BRIEF DESCRIPTION OF THE DRAWINGS

The detailed description provides one or more implementations with additional specificity and detail through the use of the accompanying drawings, as briefly described below.

FIG. 4 illustrates an example user interface of a fillable form in accordance with one or more implementations.

DETAILED DESCRIPTION

Figure 1A:
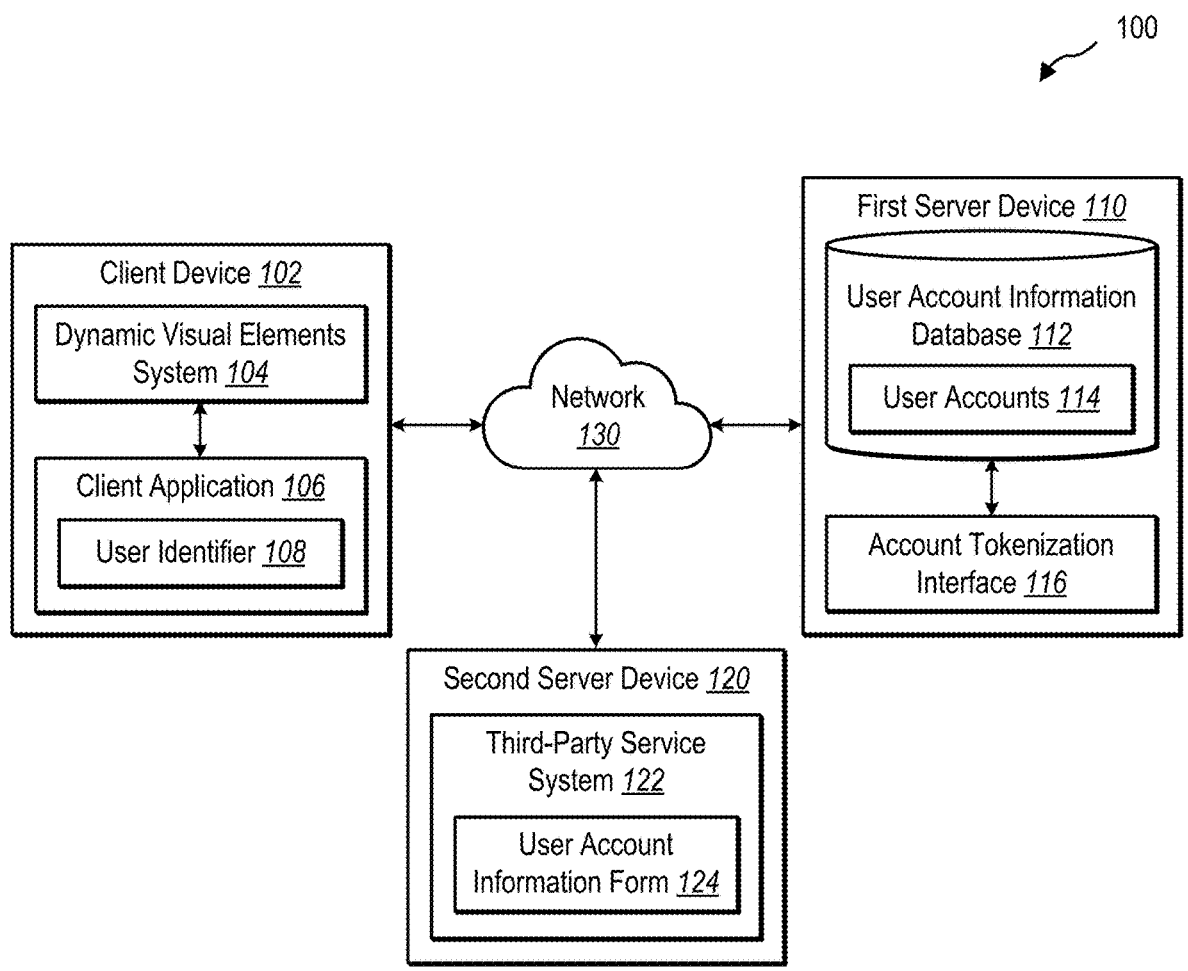
FIGS. 1A-1B illustrate an example diagram of a computing system environment where a dynamic visual elements system is implemented in accordance with one or more implementations.

This document describes utilizing a dynamic visual elements system to improve the operations and interfaces of client applications. In particular, implementations of the present disclosure provide and/or solve one or more of the foregoing or other problems in the art with systems, computer-readable media, and methods by utilizing a dynamic visual elements system that detects when alternative or tokenized account information is provided for user accounts, that generates dynamic visual elements based on the tokenized account information, and that intelligently integrates the dynamic visual elements into one or more user interfaces associated with fillable forms.

To briefly illustrate, in response to a client application providing a fillable form, the dynamic visual elements system determines when tokenized user account information is available to automatically populate the form. Before populating the fillable form, a user account selection interface is provided for selecting a user account to use to populate the form. In some instances, the dynamic visual elements system generates a selectable visual element and includes it inline with a corresponding user account within the user account selection interface. In this manner, the dynamic visual elements system unambiguously associates the tokenized account with the corresponding user account when a user is selecting a user account to use to populate the fillable form.

In addition, when populating the fillable form with tokenized account information, the dynamic visual elements system generates dynamic visual overlay elements that change appearance (e.g., shrink and expand) based on detected interactions. More importantly, these visual overlay elements link the populated tokenized account information with a corresponding user account selected by the user to populate the fillable form. Indeed, as provided in this document, the dynamic visual elements system provides different dynamic visual elements integrated into various interfaces within a client application that reduce the number of actions taken by users as a result of reduced user confusion and, thus, improving the efficiency of the computing device that implements the client application.

To illustrate, in one or more implementations, the dynamic visual elements system detects a client application displaying a fillable user account information form where the client application is associated with a user identifier. In response to detecting the fillable user account information form, the dynamic visual elements system determines that a given user account of the user identifier is associated with an account tokenization service and, as a result, generates a first visual component that includes a selectable visual element for utilizing the account tokenization service displayed inline with a partially revealed portion of the user account information of the given user account. Additionally, the dynamic visual elements system displays, as an overlay to the fillable user account information form, a graphical user interface that includes the first visual component.

In various implementations, the dynamic visual elements system populates the fillable user account information form with tokenized user account information corresponding to a given user account and provided by the account tokenization service. Additionally, in some implementations, the dynamic visual elements system generates a visual overlay element that includes the partially revealed portion of user account information of the given user account and displays the visual overlay element within the fillable user account information form. In some cases, the visual overlay element covers the tokenized user account information to display the user account information (e.g., a partially revealed portion for security reasons) of the given user account.

In one or more implementations, in response to detecting a selection of the visual overlay element, the dynamic visual elements system reduces, minimizes, shrinks, modifies, or decreases the visual overlay element to hide the partially revealed portion of user account information of the given user account while also maintaining the display of a graphic (e.g., badge or icon). Further, in one or more implementations, reducing the visual overlay element causes the tokenized user account information to become visible in the fillable user account information form along with the graphic of the visual overlay element.

As described herein, the dynamic visual elements system provides several technical benefits with respect to interface navigation and computing efficiency when compared to existing computing systems. Indeed, the dynamic visual elements system provides several practical applications that deliver benefits and/or solve problems by improving user interfaces of client applications utilizing dynamic visual elements, as further provided below.

To illustrate, in many implementations, by providing dynamic visual elements that link seemingly unrelated user accounts together within user interfaces, the dynamic visual elements system improves computer efficiency by performing operations in fewer steps. In particular, as a result of providing dynamic visual elements that link user accounts to tokenized or virtualized versions of the user account, the dynamic visual elements system performs a set of operations in a single pass, whereas existing computer systems perform the same set of operations with additional steps, often repeating actions multiple times. Accordingly, with respect to fillable forms, the dynamic visual elements system allows processes, such as populating and submitting fillable forms, to occur more quickly and with fewer repeated actions.

Additionally, by providing dynamic visual elements within a user account selection interface that link seemingly unrelated user accounts together within user interfaces, the dynamic visual elements system improves computer efficiency by reducing the number of navigational steps users take to complete a fillable form. To elaborate, existing computer systems commonly provide a tokenized version of a user account as a separate, unrelated account, which confuses users. Further, because the information of a tokenized account changes often, the constant appearance of new account information further confuses users. In these instances, users often repeat the same actions multiple times (e.g., backtracking and reperforming the same actions) to try to resolve their confusion by ensuring that they are using a tokenized version of their preferred user account. Accordingly, existing computer systems inefficiently perform repeated actions, whereas the dynamic visual elements system streamlines processes by clearly and dynamically linking tokenized user accounts with corresponding user accounts.

Further, by combining previously separated accounts into a combined visual component within a user account selection interface, the dynamic visual elements system reduces the size of user interfaces. As one example, when providing a user account selection interface for selecting an account when automatically populating a fillable form, the dynamic visual elements system combines a user account with the tokenized version of the user account into a single visual component. As another example, the dynamic visual elements system also reduces the size and space needed to display two sets of related user account information on a display by overlaying visual elements over tokenized user account information in a populated fillable form as well as by displaying user account information in connection with corresponding tokenized information.

As illustrated in the foregoing discussion, the present disclosure utilizes a variety of terms to describe the features and advantages of one or more implementations described herein. For example, the term "client application" refers to a hardware or software application executed on a computing device. In many implementations, a client application is a software application running on a client device, such as a browser, mobile application, desktop application, or system application. In various implementations, a client application provides a fillable form to receive user information such as user account information.

As another example, the term "fillable form" refers to an object or set of objects that receives inputs under the direction of a user. For instance, a fillable form includes one or more fields for a user to submit user information. In some instances, a fillable form is a fillable user account information form that receives user account information corresponding to a user, where the user is identified by a user identifier. In some implementations, a fillable form is an object that accepts user input such as text, video, audio, selections, etc. In one or more implementations, a fillable form accepts user information such as demographic, social, private, financial, and/or preference information. In various implementations, a fillable form is automatically populated with user information by the dynamic visual elements system.

As another example, the term "user account" refers to linking a user to a product or service. For example, a user account allows a user to gain access to a product or service in connection with the user providing user information to the provider of the product or service. Often, a user account is identified by a user identifier, such as a username, user handle, user account number, or another user identifier. A user account commonly includes user account information. In some examples, "user account information" refers to data, features, characteristics, and details particular to the user account with respect to a user identifier.

As another example, the term "account tokenization service" refers to a service that generates tokenized or virtualized user account information (i.e., tokenized user account information) for a user account. Tokenized user account information includes user account information that is encoded, transformed, converted, etc. to an alternate version. In some instances, the account tokenization service encodes, hides, or obfuscates the user account information (e.g., for security purposes). For instance, the account tokenization service creates a virtual version or instance (e.g., a one-time instance) of a user account.

Examples of tokenized user account information include a temporary phone number that redirects to a user's phone, a one-time password that allows access to a user account, an alias email address that delivers messages to a user's inbox, or a one-time credit card that allows items to be securely obtained without revealing the user's payment account information. In some instances, an account tokenization service is a financial institution that maintains financial records for a given user account as well as generates and provides tokenized or virtualized user account information of the given user account to authorized requesting systems.

Additionally, as used above, the dynamic visual elements system generates dynamic visual elements. In many examples, the term "visual element" refers to a graphical component shown within a graphical user interface. Visual elements include text, images, video, or other observable objects. As another example, the term "dynamic visual element" refers to a visual element that changes appearance based on a given trigger. For example, a dynamic visual element changes based on user interaction. In some instances, a dynamic visual element grows or shrinks based on a given trigger. In other instances, a dynamic visual element changes color, shape, size, text, appearance, or position based on a given trigger.

As an additional example, the term "visual component" refers to a portion of a graphical user interface. For instance, a graphical user interface is made up of multiple visual components. Further, visual components can include multiple visual elements, such as a dynamic visual element and one or more static visual elements (e.g., visual elements that do not change within a user interface).

As another example, the term "partial user account information" refers to user account information that is not fully revealed. For example, the dynamic visual elements system provides a portion of user account information for display while hiding or omitting another portion of the user account information. Additionally, in various examples, the term "overlay" primarily refers to a visual element that blocks, covers, obstructs, hides, or otherwise replaces another visual element. For example, a visual overlay element overlays and covers a portion of the user account information within a user interface (e.g., a fillable form interface). As provided below, visual overlay elements are often dynamic and change with detected user interaction. Accordingly, in some instances, a visual overlay element is adjacent to or abuts other visual elements (e.g., the visual overlay element mentioned above reduces in size to show a badge or icon next to the portion of user account information).

In some instances, the term "inline" refers to being co-located within the same visual component. For example, two visual elements are inline when they are visually associated with each other because of their similar position with each other (e.g., adjacent either vertically or horizontally). Stated differently, a first visual element is inline with a second visual element are clearly and unquestionably associated with each. For example, user account information and corresponding tokenized user account information are inline when displayed in the same visual component. On the other hand, two separate user accounts that are displayed near each other but not as linked accounts or within separate visual components are not inline with each other.

Figure 1B:
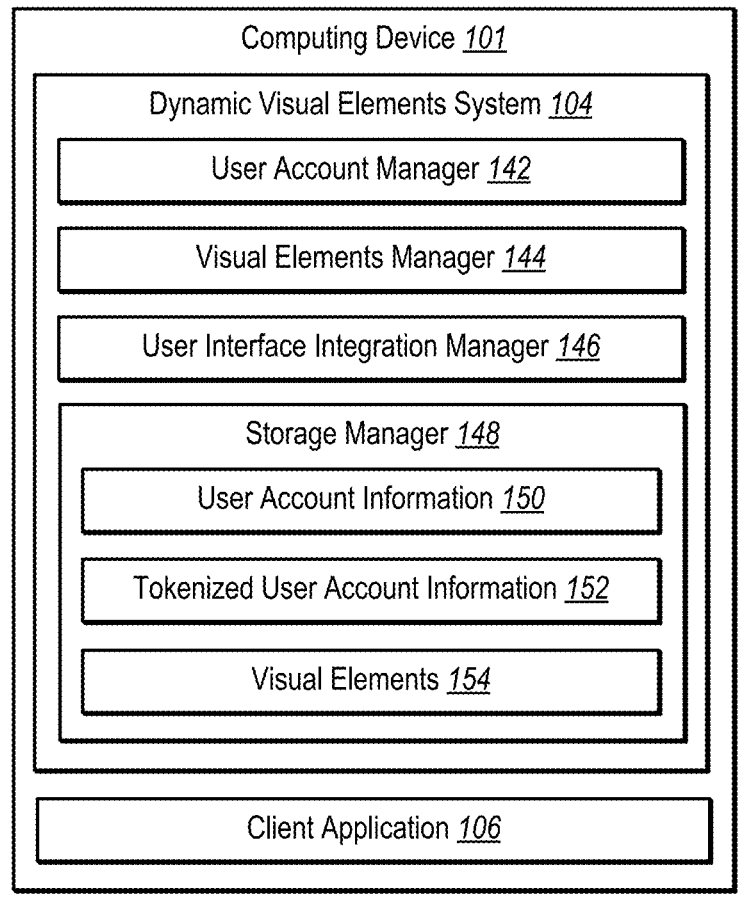

Additional details will now be provided regarding the components and elements of the dynamic visual elements system. To illustrate, FIGS. 1A-1B illustrate a schematic diagram of an environment 100 (e.g., a digital medium system environment) for implementing a dynamic visual elements system 104. In particular, FIG. 1A includes the environment 100 and FIG. 1B provides additional detail regarding components and elements of the dynamic visual elements system 104.

As illustrated in FIG. 1A, the environment 100 includes a client device 102 having the dynamic visual elements system 104, a first server device 110, and a second server device 120 in communication with each other via a network 130. Additional details regarding these and other computing devices are provided below in connection with FIG. 10. In addition, FIG. 10 also provides additional details regarding networks, such as the network 130 shown.

As mentioned, the dynamic visual elements system 104 improves computer functionality of the client device 102, in part, by streamlining user navigation and reducing user confusion. Indeed, in many implementations, the dynamic visual elements system reduces the number of navigational steps by eliminating user confusion with respect to tokenized or virtualized user accounts and their relationship to corresponding user accounts, especially with respect to automatically populating fillable form and user payment accounts (e.g., credit card accounts).

In various implementations, the dynamic visual elements system 104 generates digital visual elements in response to detecting or determining relationships between user accounts and tokenized user accounts. For example, as further described below, the dynamic visual elements system 104 generates selectable visual elements corresponding to tokenized user accounts to display inline with corresponding user accounts within the same visual component in a user account selection interface. As another example, the dynamic visual elements system 104 generates and provides dynamic visual overlay elements within fillable form user interfaces to visually tie tokenized user account information to corresponding user account information.

While shown on the client device 102, the dynamic visual elements system 104 may be located, wholly or in part on one or more computing devices. For example, the dynamic visual elements system 104 is located fully on the first server device 110, or partially on the client device 102 and partially on the first server device 110. For instance, the dynamic visual elements system 104 is primarily located on the first server device 110 and a smaller portion of the dynamic visual elements system 104 on the client device 102 communicates with the primary portion on the first server device 110 to perform the operations of the dynamic visual elements system 104 described in this document. Additional details and components of the dynamic visual elements system 104 are provided in FIG. 1B below.

Before providing more detail regarding the dynamic visual elements system 104, additional context is provided regarding an example environment in which the dynamic visual elements system 104 operates. Accordingly, FIG. 1A introduces example components and elements that help better explain the functions, operations, and actions of the dynamic visual elements system 104, which is further described in connection with the subsequent figures.

As shown in FIG. 1A, the environment 100 includes the client device 102, which has a client application 106. In various implementations, the client device 102 is associated with a user (e.g., a user client device) having one or more user identifiers. Additionally, the user identifier is shown associated with a user identifier 108. The user identifier 108 can be the same or a different user identifier associated with the client device 102. For example, the client application 106 is a browser application, a mobile application, a desktop application, or another type of application that includes a user identifier 108, which associates a user with one or more user accounts. While the environment 100 shows a single client device, the environment 100 can include any number of client devices, each of which includes an instance of the dynamic visual elements system 104.

As shown, the environment 100 includes the first server device 110 having a user account information database 112 and an account tokenizer interface 116. As also shown, the user account information database 112 includes user accounts 114. For example, the user account information database 112 maintains tables or databases of the user account information. In various implementations, the user account information database 112 maintains information for multiple user accounts associated with a single user interface (e.g., a user identifier associated with the client application).

Additionally, in one or more implementations, the account tokenizer interface 116 communicates with account tokenizer services to determine whether user accounts stored in the user account information database 112 are eligible and/or enrolled with an account tokenizer service. In some instances, the account tokenizer interface 116 retrieves a tokenized version of a user account, including new tokenized user account information and/or updated tokenized user account information for a given user account.

In one or more implementations, the first server device 110 represents one or more computing devices and serves as a content service, repository, storage, or data store for providing user account information and other services. In various implementations, the environment 100 includes any number of server devices that include user account information databases or stores. In some implementations, the first server device 110 is also located in a cloud computing system.

Additionally, FIG. 1A includes the second server device 120. As shown, the second server device 120 includes a third-party service system 122 having a user account information form 124. In many implementations, the user account information form 124 is a fillable form that collects and submits user account information permitted and/or maintained by a user. For example, the third-party service system 122 is an online product and/or service provider and the user account information form 124 is a payment form for a user to provide user payment information to complete a transaction for goods or services.

Although FIG. 1A illustrates a particular number, type, and arrangement of components within the environment 100, various additional environment configurations and arrangements are possible. For example, the environment 100 includes additional server devices similar to the second server device 120. In some implementations, the first server device 110 includes an equivalent service system as the third-party service system 122 that provides goods and/or services.

As mentioned above, FIG. 1B provides additional details regarding the capabilities and components of the dynamic visual elements system 104. To illustrate, FIG. 1B shows a computing device 101 having the dynamic visual elements system 104 and the client application 106. For instance, the computing device 101 represents the client device 102 within the environment 100, as introduced above. In other instances, the computing device 101 represents the second server device 120 or another computing device. While FIG. 1B provides some details of the dynamic visual elements system 104, further details and descriptions regarding implementations of the dynamic visual elements system 104 are provided in subsequent figures.

As illustrated, the dynamic visual elements system 104 includes various components and elements. For example, the dynamic visual elements system 104 includes a user account manager 142, a visual element manager 144, a user interface integration manager 146, and a storage manager 148. As also shown, the storage manager 148 includes user account information 150, tokenized user account information 152, and visual elements 154.

As shown, the dynamic visual elements system 104 includes the user account manager 142. In one or more implementations, the user account manager 142 requests, receives, identifies, accesses, stores, modifies, processes, sends, and/or otherwise manages user account information 150 corresponding (e.g., belonging) to user accounts. For example, in some instances, the user account manager 142 stores the user account information 150 on the computing device 101. In some implementations, the user account manager 142 requests and receives user account information (or partial user account information) for a user identifier from a user account information database 112 or a third-party service system 122.

In various implementations, the user account manager 142 detects fillable forms. For example, the user account manager 142 communicates with the client application 106 to identify a fillable form such as a fillable user account information form (e.g., a fillable payment form) that is prompting a user for user account information. In some implementations, the user account manager 142 requests and obtains indicators associated with user accounts. For example, in response to requesting a user account from the first server device 110, the user account manager receives one or more flags indicating the compatibility and/or enrollment status of the user account with a service provided by a service system.

As shown, the dynamic visual elements system 104 includes the visual element manager 144. In various implementations, the visual element manager 144 facilitates generating, creating, modifying, or otherwise managing visual elements 154, including dynamic visual elements. For example, the visual element manager 144 generates a first type of visual element (e.g., a selectable visual element) to display in a visual component that includes a user account that is associated with an account tokenization service. As another example, the visual element manager 144 generates a second type of visual element (e.g., a visual overlay element) that provides user account information 150 (e.g., partial user account information) in an overlay that covers corresponding tokenized user account information 152 within a fillable form (e.g., a fillable user account information form).

As also shown, the dynamic visual elements system 104 includes the user interface integration manager 146. In various implementations, the user interface integration manager 146 facilitates integrating, combining, merging, displaying, and/or otherwise managing visual elements 154 included in a user interface. For example, the user interface integration manager 146 adds one or more dynamic visual elements to a user interface provided by a client application.

In various implementations, the user interface integration manager 146 facilitates modifying, changing, or switching versions of dynamic visual elements based on given triggers.

For example, the user interface integration manager 146 provides a selectable visual element as a graphic that toggles between different states (e.g., active or inactive/deactivated). As another example, the user interface integration manager 146 enables a visual overlay element to shrink to a small graphic (e.g., badge or icon) to reveal visual elements 154 previously covered or hidden by the visual overlay element.

Additionally, the dynamic visual elements system 104 includes the storage manager 148. In various implementations, the storage manager 148 includes data used by any of the components of the dynamic visual elements system 104 in performing the features and functionality described in this document. For example, the storage manager 148 may include the user account information 150, the tokenized user account information 152, the visual elements 154 (including dynamic visual elements), and/or additional data.

Figure 2:
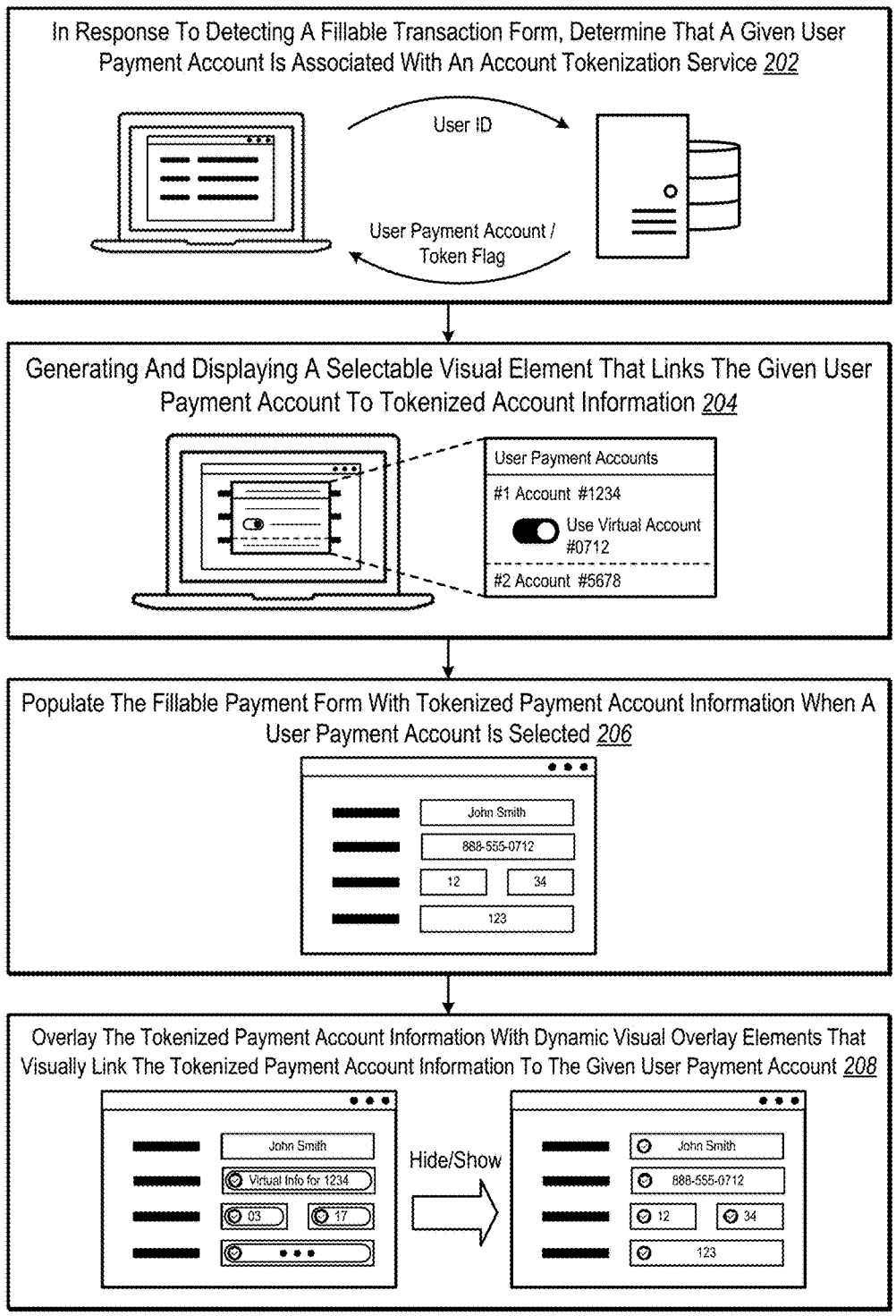
FIG. 2 illustrates an example overview for implementing the dynamic visual elements system to improve user interfaces by utilizing dynamic visual elements in accordance with one or more implementations.

Additional details in connection with an example implementation of the dynamic visual elements system 104 are discussed in connection with FIG. 2. In particular, FIG. 2 illustrates an example overview for implementing the dynamic visual elements system to improve user interfaces in accordance with one or more implementations. As shown, FIG. 2 illustrates a series of acts 200, where one or more of the acts can be performed by the dynamic visual elements system 104.

As shown in FIG. 2, the series of acts 200 includes an act 202 of determining, in response to detecting a fillable payment form, that a given user payment account is associated with an account tokenization service. For example, in one or more implementations, a client application provides or displays a fillable form, such as a fillable payment or transaction form to collect user account information (e.g., user payment information of a user payment account). In response, the dynamic visual elements system 104 detects or identifies the fillable form and sends a request to a user account database regarding available user accounts.

Additionally, in a message reply (e.g., response data), the dynamic visual elements system 104 receives information for a given user account and an indicator (e.g., a token flag) that the given user account is associated with an account tokenization service (e.g., a service that will provide tokenized user account information for a user account). Additional details regarding determining that a user account is associated with an account tokenization service are provided below in connection with FIG. 3A and FIG. 4.

In addition, FIG. 2 shows that the series of acts 200 includes an act 204 of generating and displaying a selectable visual element that links the given user payment account to tokenized account information. For example, in various implementations, when the given user account is associated with the account tokenization service, the dynamic visual elements system 104 generates and incorporates a selectable visual element into a user interface that shows available user account options for populating the fillable payment form. In this manner, the dynamic visual elements system 104 visually links the given user account to a corresponding tokenized payment account.

To further illustrate, the act 204 in FIG. 2 shows an illustration of an expanded user interface that includes a first user account (e.g., the given user account) along with a toggle element (e.g., a selectable visual element), which indicates that a virtual or tokenized version of the given user account is available. Additional details regarding generating, displaying, and interacting with a selectable visual element are provided below in connection with FIG. 3A and FIGS. 5A-5B.

As also shown, the series of acts 200 includes an act 206 of populating the fillable payment form with tokenized payment account information when a user payment account is selected. For example, when the given user account is selected with the selectable visual element in an active state, the dynamic visual elements system 104 works with the client application to populate the fillable payment form with tokenized payment account information of the given user account. Additional details regarding obtaining, identifying, generating, and/or populating fillable forms with tokenized payment account information are provided below in connection with FIG. 3B and FIG. 6A.

Further, the series of acts 200 includes an act 208 of overlaying the tokenized payment account information with dynamic visual overlay elements that visually link the tokenized payment account information to the given user payment account. For example, in various implementations, the dynamic visual elements system 104 generates visual overlay elements that include partially revealed account information about the given user account. In addition, in one or more implementations, the dynamic visual elements system 104 covers the tokenized payment account information in the fillable payment form with the visual overlay elements, which visually ties the given user account to the tokenized payment account.

In various implementations, the dynamic visual elements system 104 facilitates interaction with the visual overlay elements. For example, upon detecting a user selecting, hovering, or interacting with a visual overlay element in a particular manner, the dynamic visual elements system 104 modifies the appearance of the visual overlay elements, such as revealing the tokenized payment account information in the fillable payment form. For instance, the dynamic visual elements system 104 shrinks, modifies, or replaces the visual overlay elements with a small graphic (e.g., a badge or icon) that does not cover the tokenized payment account information, additional details regarding visual overlay elements are provided in connection with FIG. 3B and FIGS. 6A-6C.

Figure 3A:
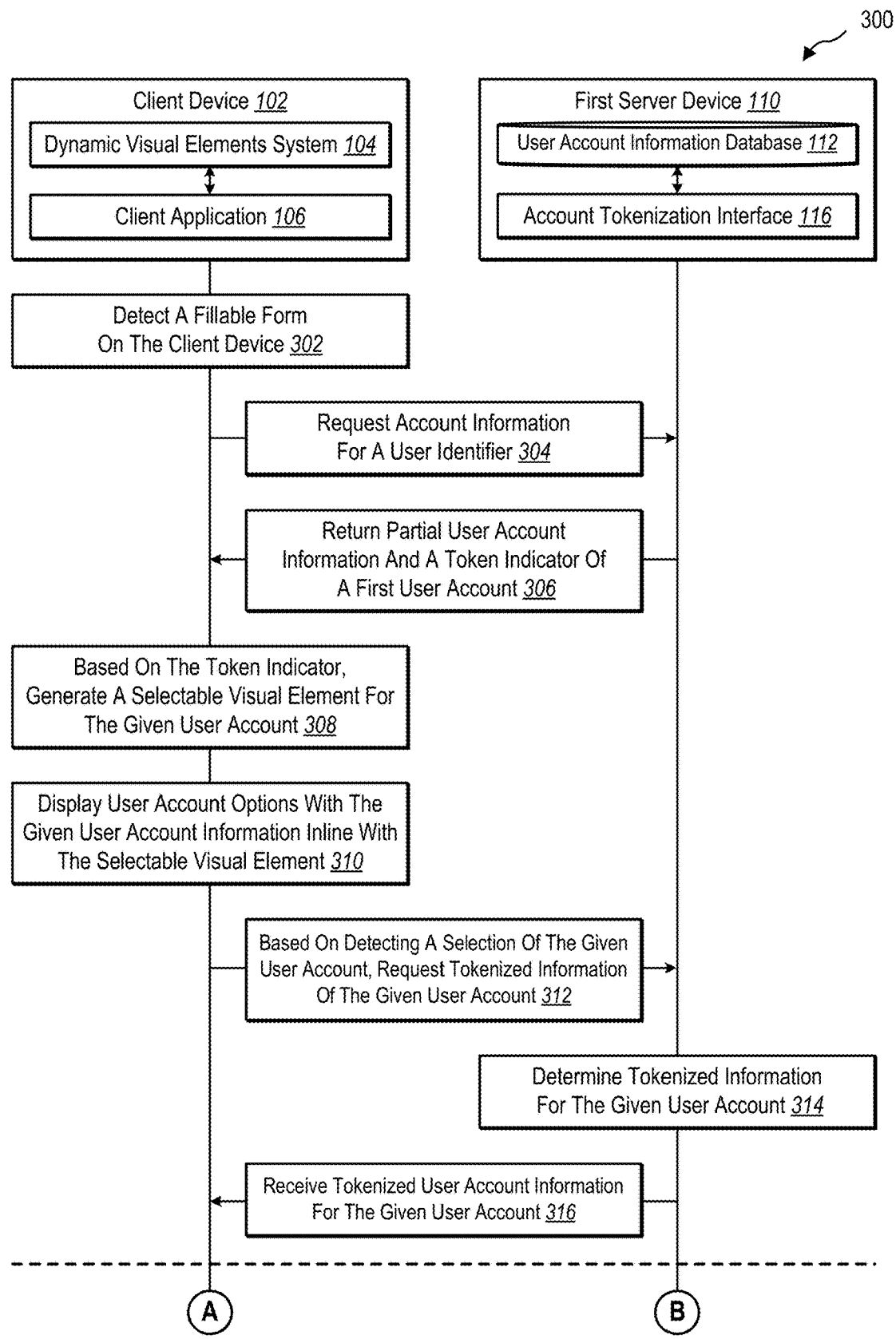
FIGS. 3A-3B illustrate an example sequence diagram for the dynamic visual elements system generating and providing various improved user interfaces in accordance with one or more implementations.
Figure 3B:
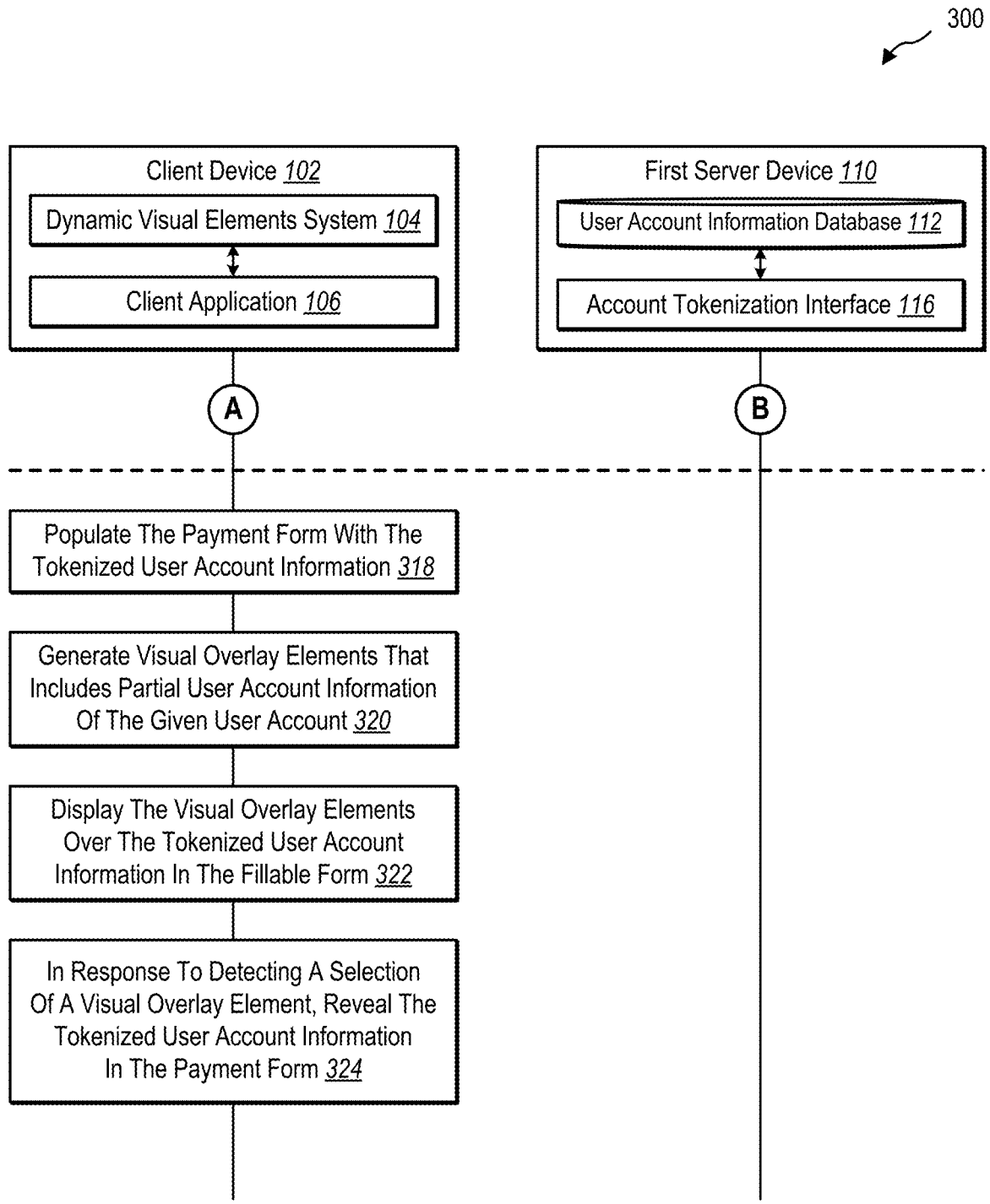

As mentioned above, FIGS. 3A-3B provide additional detail regarding operations of the dynamic visual elements system 104 with respect to selectable visual elements and visual overlay elements. In particular, FIGS. 3A-3B illustrate an example sequence diagram for the dynamic visual elements system generating and providing various improved user interfaces in accordance with one or more implementations. As shown, FIGS. 3A-3B includes the client device 102 having the dynamic visual elements system 104 and the client application 106. FIGS. 3A-3B also includes the first server device 110 having the user account information database 112 and the account tokenizer interface 116. These components were introduced previously in this document. Additionally, FIGS. 3A-3B show a series of acts 300, where one or more of the acts can be performed by the dynamic visual elements system 104.

As shown in FIG. 3A, the series of acts 300 includes an act 302 of detecting a fillable form on the client device. For instance, the client application 106 on the client device 102 is a browser or device application that facilitates purchasing products or services. As part of the purchase process, a fillable form is provided to a user. In response, when the fillable form is detected, the dynamic visual elements system 104 and/or the client application 106 detects the fillable form. As an example, in connection with rendering and displaying the fillable form, the client application 106 identifies the fillable form. In some implementations, the dynamic visual elements system 104 provides, inserts, or injects instructions into the client application 106 for sending out a call or a notification when a fillable form is provided to a user.

As shown, the series of acts 300 includes an act 304 of requesting account information for a user identifier. For instance, the dynamic visual elements system 104 and/or the client application 106 sends a request to the first server device 110 for account information where the request includes a user identifier of the user. In some instances, the request includes a query for user account information as well as additional queries, such as if any of the user accounts associated with the user interface are also associated with an account tokenization service.

In response to receiving the request from the client device 102, the first server device 110 (or a user account system on the first server device 110) identifies relevant user accounts and provides them back to the client device 102. For instance, in various implementations, the first server device 110 accesses the user account information database 112 to identify user accounts associated with the user.

By way of context, the client application 106 and the user account information database 112 may be linked such that when the user registers an account on the client device, user account information is stored within the user account information database 112. For example, the user account information database 112 stores personal, contact, and payment information along with user preferences under a user identifier. By storing information associated with a user identifier, the first server device 110 provides access to user account to any number of client devices associated with the user identifier and/or proper authorization.

In various implementations, some user information, such as payment information is partially stored and/or stored in a tokenized version for security purposes. For example, for payment information, such as bank or credit card information, the user account information database 112 includes only a portion of the user account number and other user account information. In some instances, the user account information database 112 does not store all of the user account information for a user account (e.g., the card verification value (CVV) of a credit card is not stored). By maintaining only partial pieces of the user account information for a user account, the user account information database 112 better safeguards against revealing the user's account information to an unauthorized party.

As shown in the act 306 of the series of acts 300, the first server device 110 returns partial user account information and a token indicator of a given user account (e.g., response data). For example, the first server device 110 identifies various user accounts from the user account information database 112 that belong to the user identifier. As noted above, in some instances, only partial user account information is stored for a user account. Accordingly, the first server device 110 returns the partial user account information, such as the last 4-digits of a user account (e.g., a bank account, credit card, membership number, etc.). Full user account information may be returned instead if available.

Additionally, in one or more implementations, the user account information database 112 also includes information regarding whether a given user account of the user interface is associated with an account tokenizer service. For example, the user account information database 112 includes whether a given user account is enrolled with an account tokenizer service and/or whether a tokenized version of a user account is currently being stored (e.g., one-time credit card information).

As another example, the user account information database 112 includes whether a user account is eligible for tokenization. For instance, the user account is not enrolled but is eligible for enrollment. In various implementations, the user account information database 112 includes or generates token indicators (e.g., token flags) for enrollment and/or eligibility. Accordingly, as part of the act 306, the first server device 110 returns one or more token indicators with user accounts that indicate enrollment and/or eligibility with an account tokenizer service. In some instances, if the user account information database 112 has a tokenized version of a given user account (or partial tokenized user account information), the first server device 110 also returns the partial tokenized user account information (e.g., the last 4-digits) in the response message.

In one or more implementations, the client device 102 locally stores user account information. For example, the client device 102 includes a database similar to the user account information database 112 and includes user account information for a user identifier. Additionally, or in the alternative, the client device 102 includes an account tokenizer interface 116 that interfaces with an account tokenizer service to obtain tokenized user account information. In these implementations, the client device 102 can perform the acts 304 and 306 internally without needing to query the first server device 110.

As shown, the series of acts 300 includes an act 308 of the client device 102 generating, based on the token indicator, a selectable visual element for the given user account. For instance, if the token indicator is a token flag that indicates that the given user account is enrolled or eligible to enroll with an account tokenizer service (e.g., the given user account can be tokenized or virtualized), the dynamic visual elements system 104 generates a selectable visual element to associate with the given user account. Otherwise, if the token indicator does not indicate an association with an account tokenizer service, the dynamic visual elements system 104 moves to the next act of displaying the given user account, but without displaying the selectable visual element.

As mentioned above, the presence of the selectable visual element indicates an association between the given user account and an account tokenizer. Additionally, in one or more implementations, the selectable visual element includes multiple states. For example, in an active state or "on" state, the selectable visual element shows a first graphic that indicates a positive selection. In an inactive state or "off" state, the selectable visual element shows a second graphic that indicates a negative selection. Additionally, the selectable visual element changes state based on detected interactions. In various implementations, the selectable visual element includes additional states.

FIG. 3A shows that the series of acts 300 includes an act 310 of the client device 102 displaying user account options with the given user account information in line with the selectable visual element. In various implementations, the dynamic visual elements system 104 generates a visual component that includes partial account information for the given user account of the user identifier inline with the selectable visual element, where the selectable visual element visually signals to the user that the given user account has a tokenized or virtual option. Indeed, the visual component visually groups the given user account information with the selectable visual element such that the selectable visual element is decisively connected to the given user account as well as decisively not connected to other user accounts.

Figure 5A:
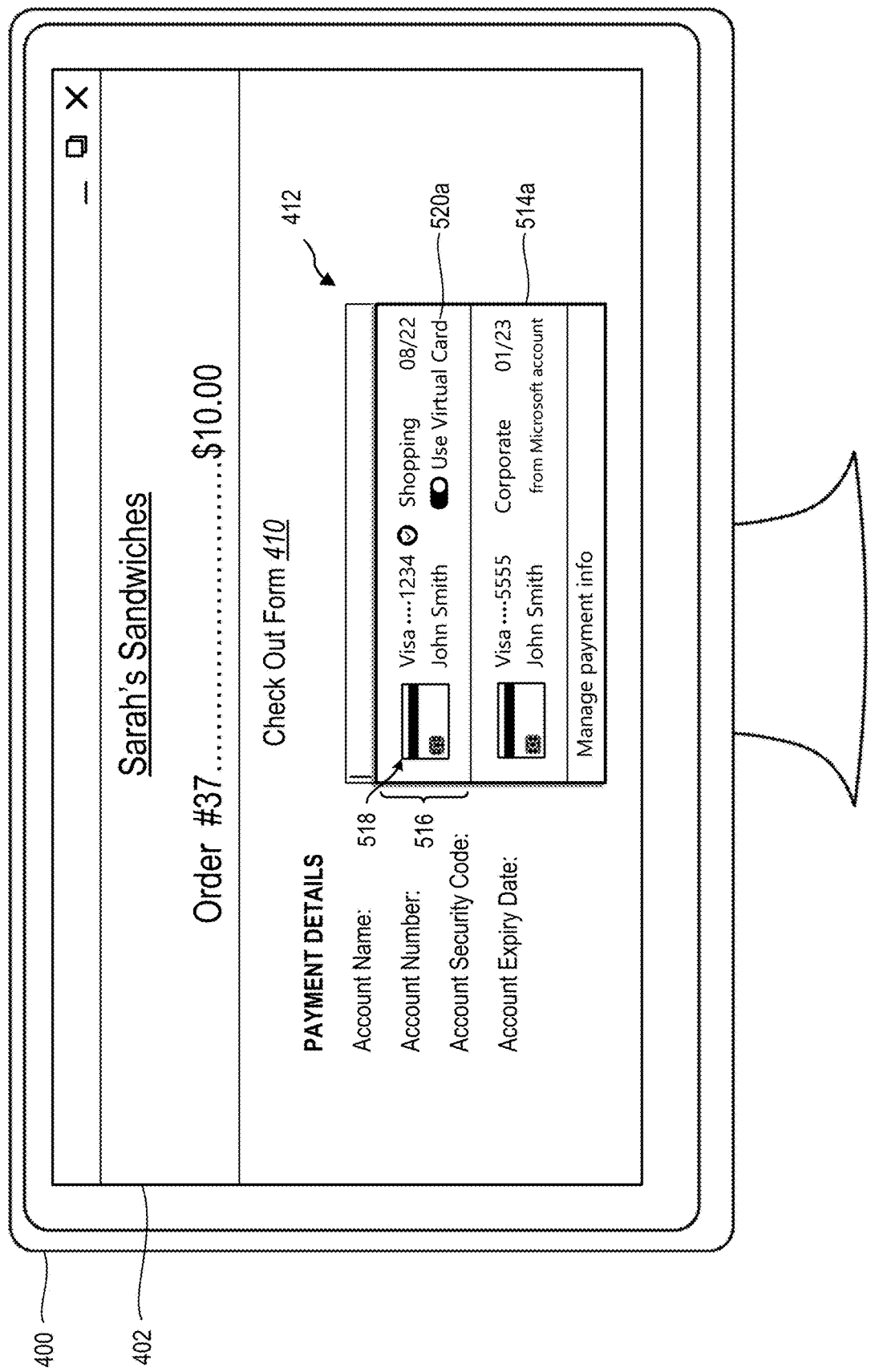
FIGS. 5A-5B illustrate examples of a dynamic selectable visual element with a visual component of a user account selection interface, which is associated with a fillable form, in accordance with one or more implementations.
Figure 5B:
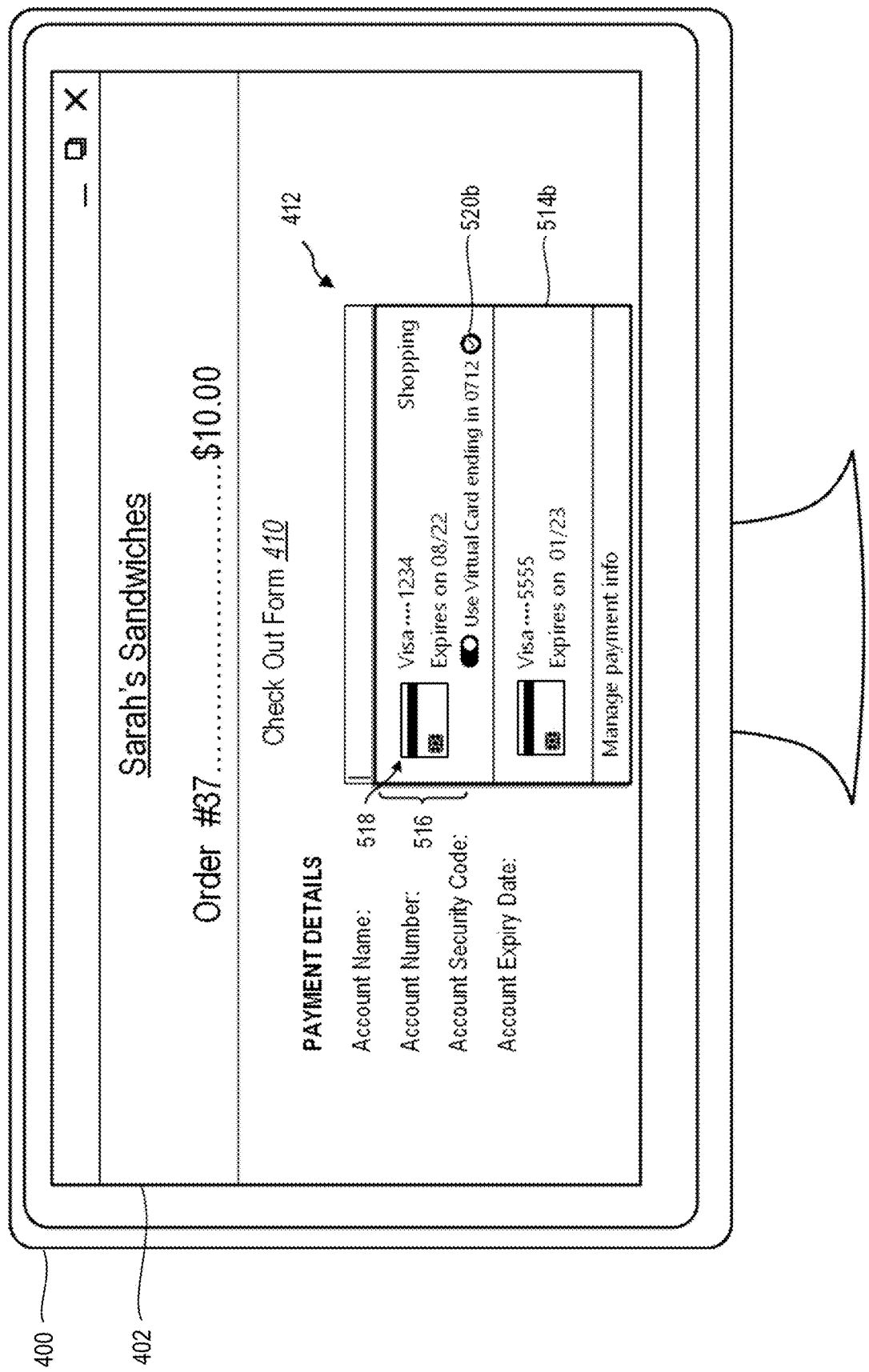

Additionally, the client device 102, dynamic visual elements system 104, and/or the client application 106 can display a user interface that includes user account options in connection with the fillable payment form, where the user interface includes the visual component (described above in connection with the act 310) showing the account information (e.g., partial user account information) inline with the selectable visual element. In some instances, the user interface includes additional visual components corresponding to additional user accounts, which may or may not include their own corresponding selectable visual element. Example illustrations of displaying a user account selection interface with the visual component having the selectable visual element are shown in FIGS. 5A-5B, which are described below.

As shown, the series of acts 300 includes an act 312 of the client device 102 requesting, based on detecting a selection of the given user account, tokenized information of the given user account. In various implementations, the client device 102 detects a selection of the given user account by a user when the selectable visual element is in an active state. In response, the dynamic visual elements system 104 and/or the client application 106 sends a request to the first server device 110 for tokenized information for the given user account. In many implementations, the request includes an indicator of the selected user account (e.g., an account identifier and/or partial user account information of the given user account).

In some implementations, the state of the selectable visual element is based on a default setting or a user preference. For example, the selectable visual element defaults to the last used state, the active state, the inactive state, another default state, or is based on additional factors (e.g., whether a user profile on the client application 106 is set to a personal or business profile). Further, in various instances, the client device 102 detects interactions (with the selectable visual element) changing the state of the selectable visual element before detecting the selection of the given user account. If the user interaction causes the state of the selectable visual element to change to inactive, the selection of the given user account will not trigger the act 312, but rather will move forward with using the untokenized information of the given user account to populate the fillable payment form.

In various implementations, the act 312 includes providing a payment identifier, transaction number, fillable form identifier, session identifier, or another type of identifier that links the request to the fillable payment form and/or the current transaction being processed. In this manner, a response to the request is tracked to the correct fillable payment form, transaction, etc., on the client device 102. Additionally, in various implementations, the client device 102 (e.g., the client application 106) performs one or more security authentications before sending the request for tokenized user account information for the given user account to the first server device 110.

As shown, the series of acts 300 includes an act 314 of the first server device 110 determining tokenized information for the given user account. For example, the account tokenizer interface 116 on the first server device 110 obtains the full or partial user account information for the given user account from the request and/or the user account information database 112 and queries an account tokenization service for tokenized information for the given user account. In response, the account tokenization service returns the tokenized user account information.

In various implementations, the account tokenizer interface 116 maintains one or more portions of tokenized user account information for a given user account but needs to communicate with the account tokenization service for updated information for another portion of the user account information. For example, the user account information database 112 maintains a tokenized account number and/or expiry date of a given user account, but requires a new security code (e.g., CVV) for each transaction. In this example, the account tokenizer interface 116 gets a new security code for each use of the tokenized version of the given user account. In some implementations, the account tokenizer interface 116 requests and/or obtains a completely new version of tokenized information of the given user account (e.g., a new one-time account number) from the account tokenization service.

As also shown, the series of acts 300 includes an act 316 of the client device 102 receiving tokenized user account information for the given user account from the first server device 110. For example, the client device 102 receives full or partial tokenized user account information for the given user account in response to its request. In various implementations, the response also includes the payment identifier (or other identifiers) sent over in the request so that the client device 102 and/or client application 106 can link the received tokenized user account information to the correct fillable payment form.

Figure 6A:
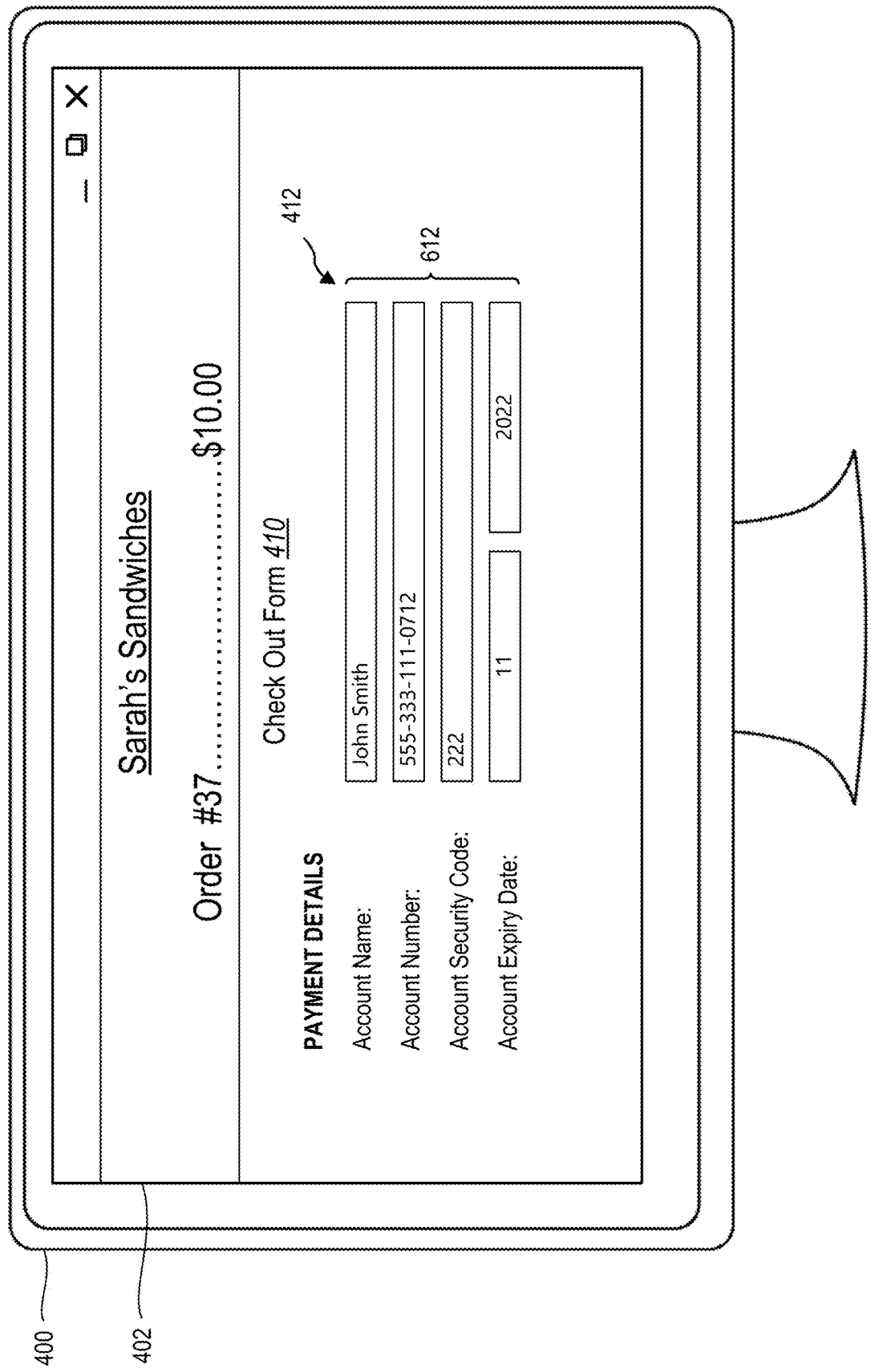
FIGS. 6A-6C illustrate example user interfaces that include dynamic visual overlay elements in a fillable form in accordance with one or more implementations.

Continuing to FIG. 3B, the series of acts 300 includes an act 318 of the client device 102 populating the fillable payment form with the tokenized user account information. For example, the client application 106 automatically fills in the fillable payment form (i.e., the fillable user account information form) with the received tokenized user account information. An example illustration of this is shown in FIG. 6A, which is described below.

Additionally, as shown in FIG. 3B, the series of acts 300 includes an act 320 of the dynamic visual elements system 104 generating visual overlay elements that include partial user account information of the given user account. In various implementations, the dynamic visual elements system 104 generates one or more visual overlay elements that include some or all of the user account information of the given user account. For example, the dynamic visual elements system 104 generates a first visual overlay element that includes the last 4-digits of the given user account number along with informative text. As another example, the dynamic visual elements system 104 generates additional visual overlay elements that include other pieces of the user account information of the given user account. In some instances, some of the user account information included in a visual overlay element is hidden or concealed (e.g., visually represented as bullets or dots).

Further, in various implementations, the dynamic visual elements system 104 includes a graphic (e.g., a badge, icon, image, symbol, emoji, or other graphic) within one or more of the visual overlay elements. For example, the dynamic visual elements system 104 adds a shield badge or icon to one or more visual overlay elements along with the user account information of the given user account.

Figure 6B:
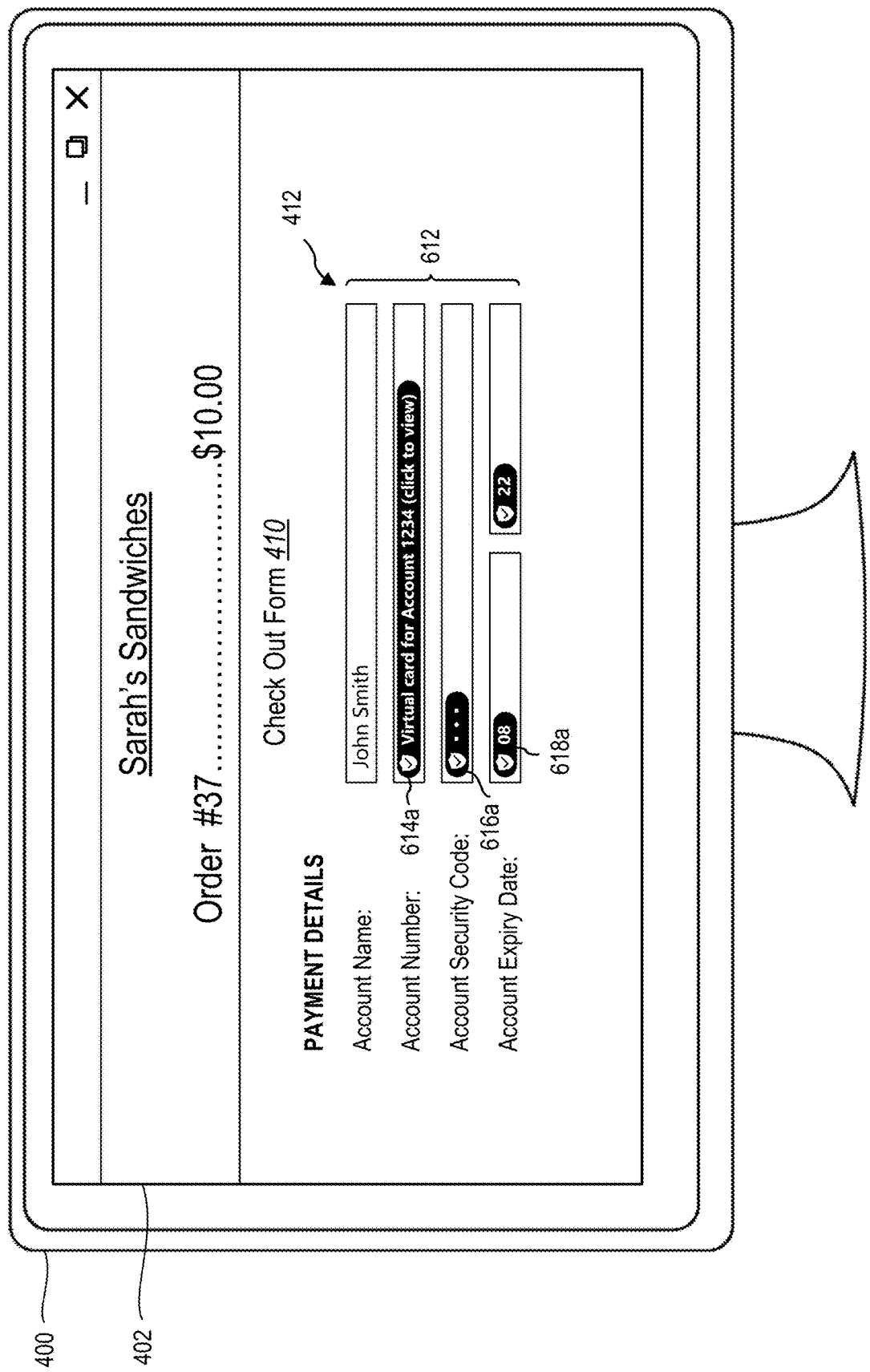

As shown, the series of acts 300 includes an act 322 of displaying the visual overlay elements over the tokenized user account information in the fillable payment form. For example, the dynamic visual elements system 104 displays, or works with the client application 106 to display, the generated visual overlay elements over (in front of) corresponding portions of user account information of the given user account. For instance, the dynamic visual elements system 104 displays the first visual overlay element that includes a portion of the given user account number over the filled-in text of the tokenized user account number. The dynamic visual elements system 104 can display and/or cover other portions of the tokenized user account information with visual overlay elements displaying corresponding pieces of the user account information of the given user account. Illustrative examples of visual overlaying elements are shown in FIG. 6B, which is described below.

FIG. 3B also shows that the series of acts 300 includes an act 324 of revealing, in response to detecting a selection of a visual overlay element, the tokenized user account information in the fillable form. For example, in generating the visual overlay elements, the dynamic visual elements system 104 includes dynamic functionality that allows for user interaction to modify the appearance of one or more visual overlay elements. For instance, upon detecting the selection of a visual overlay element, the dynamic visual elements system 104 causes the visual overlay element to shrink in appearance (e.g., shrink from a long element with a badge icon and text to a small element with just the badge icon).

In some implementations, interaction with one visual overlay element causes modifications to occur to other visual overlay elements. For example, upon detecting the selection of a first visual overlay element, the dynamic visual elements system 104 causes the first visual overlay element to shrink in appearance as well as causes one or more of the other visual overlay elements to also shrink in their appearance. In alternative implementations, each visual overlay element dynamically changes independent of the other displayed visual overlay elements in a user interface. Illustrative examples of visual overlaying elements dynamically changing are shown in FIGS. 6A-6B, which figures are described below.

Turning to the next set of figures, FIGS. 4, 5A-5B, and 6A-6C provide example user interfaces of the dynamic visual elements system 104 for generating, displaying, and dynamically modifying visual elements (e.g., selectable visual elements and visual overlay elements). These figures include a client device 400 having a graphical user interface 402. In various implementations, the client device 400 represents the client device 102 introduced above. Additionally, for ease and explanation, the graphical user interface 402 in FIGS. 4, 5A-5B, and 6A-6C corresponds to a client application, such as a web browser, that displays part of the checkout process for purchasing an online order from a sandwich shop.

To illustrate, FIG. 4 introduces a fillable form 410 within the graphical user interface 402. As shown, the fillable form 410 (shown as a "check out form") is provided as a user account information form for collecting user information associated with a user identifier. In various implementations, the fillable form 410 is a fillable user payment information form (or simply a fillable payment form) or another type of form where user information is submitted.

As also shown, the fillable form 410 includes fillable fields 412 for collecting inputted user information. In various implementations, the fillable fields 412 accept alphanumeric text, such as characters or numbers. In some implementations, the fillable fields 412 can accept various types of input, such as drawing, images, gestures, audio, and/or video.

As mentioned above, the dynamic visual elements system 104 and/or a client application on the client device 400 detects or identifies when a fillable form is being provided or displayed to a user identifier associated with the client device 400. In connection with recognizing the fillable form, the dynamic visual elements system 104 and/or a client application obtains user account information associated with the user identifier of the user, as described above in connection with FIG. 3A. Additionally, the dynamic visual elements system 104 and/or a client application provides, in various instances, the user account information for display on the client device 400 (e.g., within a user account selection interface).

To elaborate, if the user account information returns a token indication for a given user account signaling that the given user account is associated with an account tokenization service, as provided above, the dynamic visual elements system 104 can generate and provide a selectable visual element to be displayed together (e.g., inline) with the given user account. If a given user account is returned with no token indicator or the token indicator signals no association with an account tokenization service, the dynamic visual elements system 104 does not generate a selectable visual element to be displayed with the given user account in the user account selection interface.

To illustrate, FIGS. 5A-5B illustrate examples of a dynamic selectable visual element with a visual component of a user account selection interface, which is associated with a fillable form, in accordance with one or more implementations. More specifically, FIGS. 5A-5B show two versions of a user account selection interface 518, which each shows user account information for multiple user accounts associated with the user identifier. More particularly, the user account selection interface 518 in FIGS. 5A-5B display a first visual component 514 that provides user account information of a first user account associated with the user identifier and a second visual component 516 that provides user account information of a second user account associated with the user identifier. While two visual components are shown, the user account selection interface 518 may include additional or fewer visual components that each provide user account information of a user account associated with the user identifier.

As also shown in FIGS. 5A-5B, the first visual component 514 of the user account selection interface 518 includes a selectable visual element. For example, FIG. 5A shows a first version of a selectable visual element 520a inline with the first user account. In various implementations, the selectable visual element includes a single element, such as the toggle element. In some implementations, the selectable visual element includes additional parts, such as text and/or a virtualized (e.g., tokenized) account graphic (e.g., the shield badge). As another example, FIG. 5B shows a second version of a selectable visual element 520b inline with the first user account, where additional context is displayed, such as the last 4-digits of the tokenized user account information.

As mentioned above, in various implementations, the dynamic visual elements system 104 obtains user account information to display within the user account selection interface 518 in response to detecting the fillable form 410. In some implementations, the dynamic visual elements system 104 causes the client application 106 to wait for a particular type of user interaction before showing the user account selection interface 518. For instance, the client application 106 displays the user account selection interface 518 upon detecting interactions with one of the fillable fields 412. For example, upon detecting a pointer (e.g., a mouse or a finger) interaction (e.g., click, point, hover, etc.) with one of the fillable fields 412, the client application 106 displays the user account selection interface 518, as shown in FIGS. 5A-5B.

As further shown in FIGS. 5A-5B, the first user account includes a selectable visual element that indicates that the first user account is associated with an account tokenization service. Indeed, by providing the selectable visual element inline with the first user account, the dynamic visual elements system 104 eliminates any ambiguity that a virtual user account is another version of the first user account and a virtualized version at that. Further, by displaying the selectable visual element inline with the first user account in the same visual component, the dynamic visual elements system 104 reduces the display and screen space needed to separately display the tokenized user account as a separate payment option, which streamlines the selection of a preferred version of a user account as well as significantly reduces user confusion.

As also shown, the second user account is not associated with an account tokenization service. Accordingly, the second user account in the second visual component 516 is not shown with a selectable visual element for enabling secure tokenization of the user account. Indeed, in this example, the second user account is neither enrolled nor eligible to enroll with an account tokenization service.

In certain implementations, the dynamic visual elements system 104 identifies a reason why a user account is not allowed to use an account tokenization service. In these instances, the dynamic visual elements system 104 may provide an indication, such as text or a message, in place of a selectable visual element. For example, if a given product and service provider associated with a user account does not allow tokenized user account information (e.g., they don't offer one-time virtual credit cards), the dynamic visual elements system 104 indicates this within the corresponding visual component inline with the user account information. In some instances, the dynamic visual elements system 104 indicates that tokenized user account information still works and is authorized for other product and service providers.

In various implementations, the selectable visual element appears when a given user account is enrolled with or is eligible to enroll with an account tokenization service. To elaborate, when the user identifier has enrolled the first user account with the selectable visual element, upon selecting the first user account with the selectable visual element while it is in an active state, the dynamic visual elements system 104 utilizes the virtual (e.g., tokenized) user account information in place of the first user account information. If the first user account is eligible but not yet enrolled, the dynamic visual elements system 104 directs the user to the account tokenization service to enroll with the account tokenization service.

Upon selecting a given user account from the user account selection interface 518 that is also enrolled with an account tokenization service, the dynamic visual elements system 104 obtains tokenized user account information for the given user account, as described above in connection with FIG. 3A. For example, in some instances, the dynamic visual elements system 104 queries an account tokenizer interface to interface with a corresponding account tokenization service to obtain tokenized user account information for the given user account, such as a new security code value (e.g., CVV) and/or a new tokenized user account information. With the tokenized user account information, the dynamic visual elements system 104 can cause the tokenized information to be automatically populated in the fillable form 410.

Figure 6C:
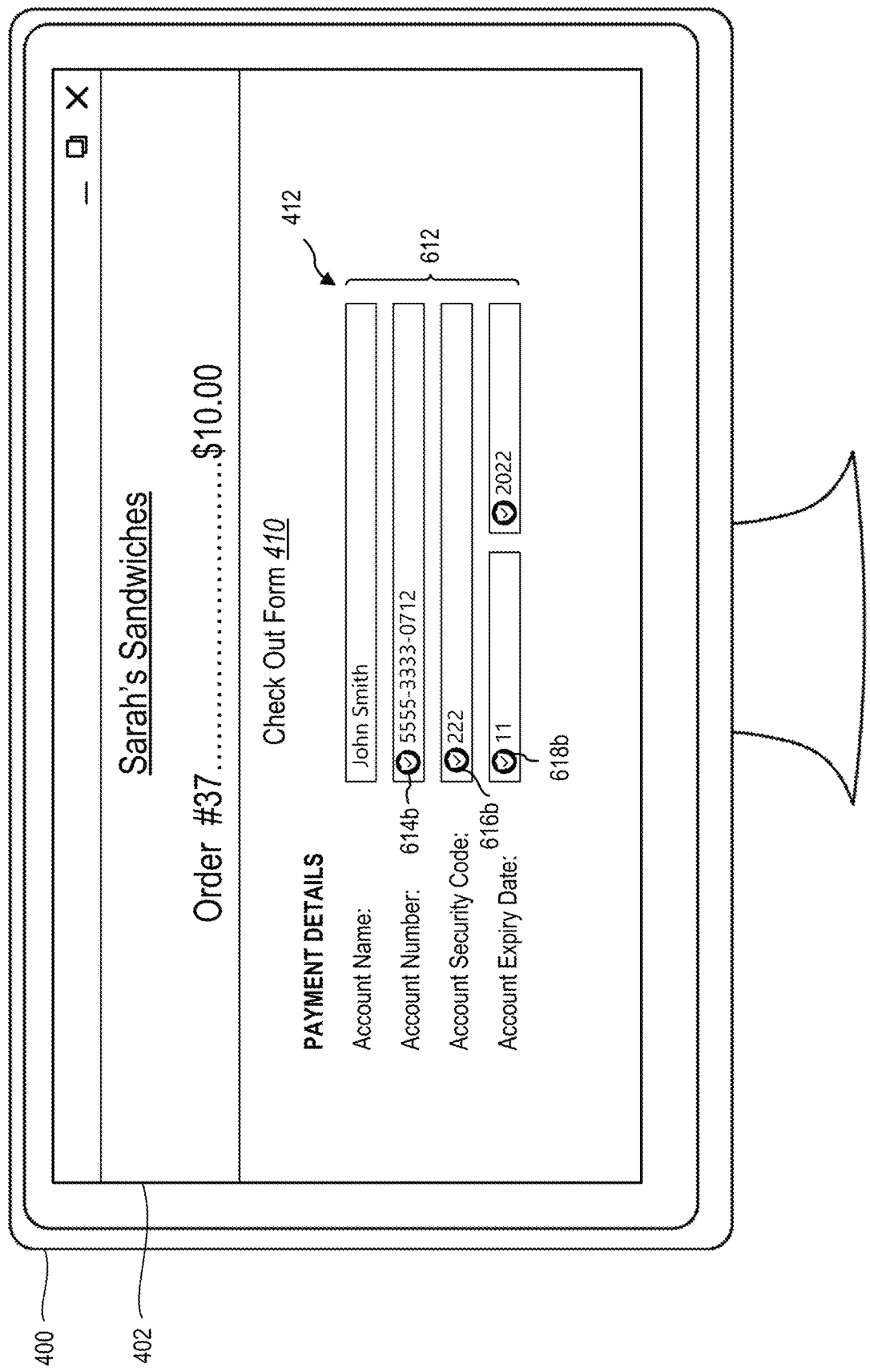

Continuing on, FIGS. 6A-6C show example user interfaces that include dynamic visual overlay elements in a fillable form in accordance with one or more implementations. For instance, FIG. 6A shows the fillable form 410 populated with the tokenized user account information 612 for the first user account. In particular, the fillable fields 412 include corresponding portions of the tokenized user account information.

In various implementations, the dynamic visual elements system 104 populates the fillable form 410 with the tokenized user account information 612 in a background process that is initially hidden from display. In some implementations, the tokenized user account information 612 may briefly appear on display, if at all, before being covered by visual overlay elements. In alternative implementations, the tokenized user account information is populated concurrently or after corresponding visual overlay elements, which are described next To elaborate, FIG. 6B shows the tokenized user account information 612 in the fillable form 410 covered with visual overlay elements 614 generated by the dynamic visual elements system. As shown, the visual overlay elements 614 cover up the tokenized user account information and instead provide user account information of the first user account. In this manner, the dynamic visual elements system 104 provides a clear link, connection, or relationship between tokenized user account information and the first user account, which eliminates any user confusion about the tokenized information not belonging to the user and/or the user account information is incorrect. Further, because the dynamic visual elements system 104 utilizes overlay elements, additional user interface space is not needed to provide this clarifying feature.

More specifically, FIG. 6B shows a first visual overlay element 616a that includes a graphic (e.g., a shield badge icon) and informative text indicating that the fillable form is populated with tokenized user account information that directly relates to the first user account selected by the user. In addition, as shown, the first visual overlay element 616a includes instructions (e.g., "click or hover to hide") for interacting with the visual overlay element. In various implementations, the first visual overlay element 616a includes less informative information or instructions, or the instructions are provided elsewhere within the fillable form 410.

As also shown, the fillable form 410 in FIG. 6B includes additional visual overlay elements 618a. In some implementations, the dynamic visual elements system 104 generates and provides additional visual overlay elements for some or all of the fillable fields 412. As shown, the additional visual overlay elements 618a cover pieces of tokenized user account information and instead display corresponding pieces of user account information of the first user account. Further, the additional visual overlay elements 618a also include the graphic (e.g., the shield badge) mentioned above. In some instances, additional visual overlay elements 618a are not displayed in one or more of the fillable fields 412 (e.g., the shield badge only appears in the first field). In one or more instances, one or more of the additional visual overlay elements 618a do not include the graphic (e.g., a visual overlay element disappears completely, temporarily or permanently, in response to detected interaction).

As mentioned above, the visual overlay elements generated by the dynamic visual elements system 104 are dynamic and can be automatically modified based on detected user interaction. For example, when a user hovers over or clicks the first visual overlay element 616a, the dynamic visual elements system 104 causes the first visual overlay element 616a to shrink, reduce, modify, or switch to display a smaller visual overlay element version, which is shown in FIG. 6C. In one instance, the dynamic visual elements system 104 shrinks the first visual overlay element 616a for the duration of a pointer hover before returning the 614a to its full overlay. In another instance, the dynamic visual elements system 104 switches the first visual overlay element 616a to the smaller version until another click is detected to expand the first visual overlay element 616a to its initial size.

Additionally, in some implementations, upon detecting an interaction with the first visual overlay element 616a (e.g., a click), the dynamic visual elements system 104 reduces the size of the first visual overlay element 616a as well as each of the additional visual overlay elements 618a. Similarly, an interaction with one of the visual overlay elements can modify the size and/or appearance of other visual overlay elements displayed.

To better illustrate, FIG. 6C shows the visual overlay elements 614 modifying, reducing, switching, changing, and/or shrinking upon detecting a user interaction with respect to one of the visual overlay elements, such as the first visual overlay element 616a. As shown, the visual overlay elements 614 in FIG. 6C displays a first modified visual overlay element 616b and the additional modified visual overlay elements 618b. In the illustrated example, the visual overlay elements shirk to display/reveal the graphic badge.

When a dynamic visual overlay element changes, reduces, shrinks, or switches from a first appearance to a second appearance, the tokenized user account information for the first user account is revealed. However, the smaller version of the visual overlay element remains in at least one of the fillable fields 412. In this manner, the smaller visual overlay element that displays only the shield badge does not cover, block, or otherwise obfuscate the token user account information, while it also indicates that the tokenized user account information is associated with a user and is not incorrect user account information.

In one or more implementations, when detecting additional interactions with the visual overlay elements 614, the dynamic visual elements system 104 can switch between the visual overlay elements and the modified visual overlay elements. This can occur while maintaining at least one version of the visual overlay elements as a signal that the user account information populated in the fillable form 410 is tokenized user account information associated with a user account.

With the tokenized user account information populated in the fillable form 410, the client application 106 can submit the user account information. For example, the client application submits the populated fillable form to the provider of the fillable form 410 or a third-party processing system. In various instances, because the tokenized user account information shares the same format as corresponding user accounts, systems that receive the tokenized user account information do not need to change any protocols or schemes to process the user account information. Further, in many instances, the receiving systems are unaware that the submitted user account information is tokenized.

Figure 7:
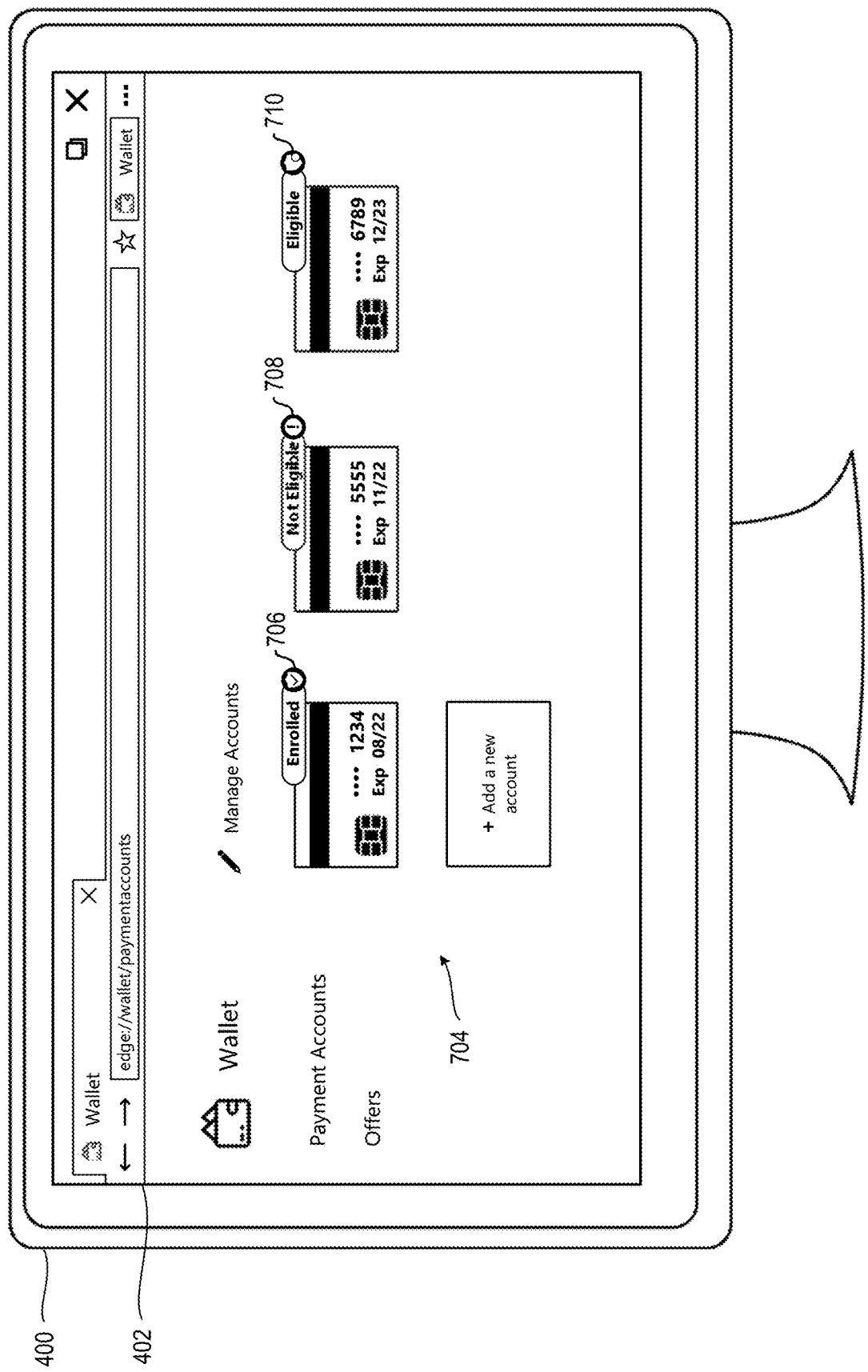
FIG. 7 illustrates an example user account management user interface having dynamic visual elements in accordance with one or more implementations.

FIG. 7 illustrates an example user account management user interface having dynamic visual elements. FIG. 7 also shows the client device 400 with a graphical user interface 702 that has been updated to manage user accounts. As shown, the graphical user interface 702 shows a wallet interface that includes user payment accounts 704 associated with a user identifier among other elements.

In various implementations, the graphical user interface 702 allows a user to view and manage the user payment accounts 704 associated with their user identifier. For example, upon selecting a user payment account that is associated with one or more virtual payment accounts (e.g., one or more virtual cards), the graphical user interface 702 updates to show previous transactions of the user payment account. If a transaction was made with a virtual payment account associated with the user payment account, the graphical user interface 702 updates to show tokenized user account information used in the transaction, such as some or all of the virtual payment account numbers used in the transaction. In this manner, even if all transactions are drawn from the same user payment account, a user can track which virtual payment information was used for which transaction.

With regard to managing the user payment accounts 704, in various implementations, the dynamic visual elements system 104 provides indicators in connection with one or more of the user accounts to signal whether the user account is associated with an account tokenization service. In various implementations, the dynamic visual elements system 104 allows a user to add, modify, opt out, and/or remove enrollment with any account tokenization service for any user account, where appropriate.

To illustrate, as shown with the first user account on the left, the dynamic visual elements system 104 generates and provides an enrolled visual element 706 indicating that the first user account is currently associated and enrolled with an account tokenization service. As shown with the second user account in the middle, the dynamic visual elements system 104 generates and provides a denied visual element 708 indicating that the second user account is not eligible to be associated with an account tokenization service. Likewise, as shown with the third user account on the right, the dynamic visual elements system 104 generates and provides an eligible visual element 710 indicating that the third user account is associated with an account tokenization service but that the user has not yet enrolled with the account tokenization service. In various implementations, the dynamic visual elements system 104 enables the user to interact with the eligible visual element 710 to enroll with the account tokenization service.

Figure 8:
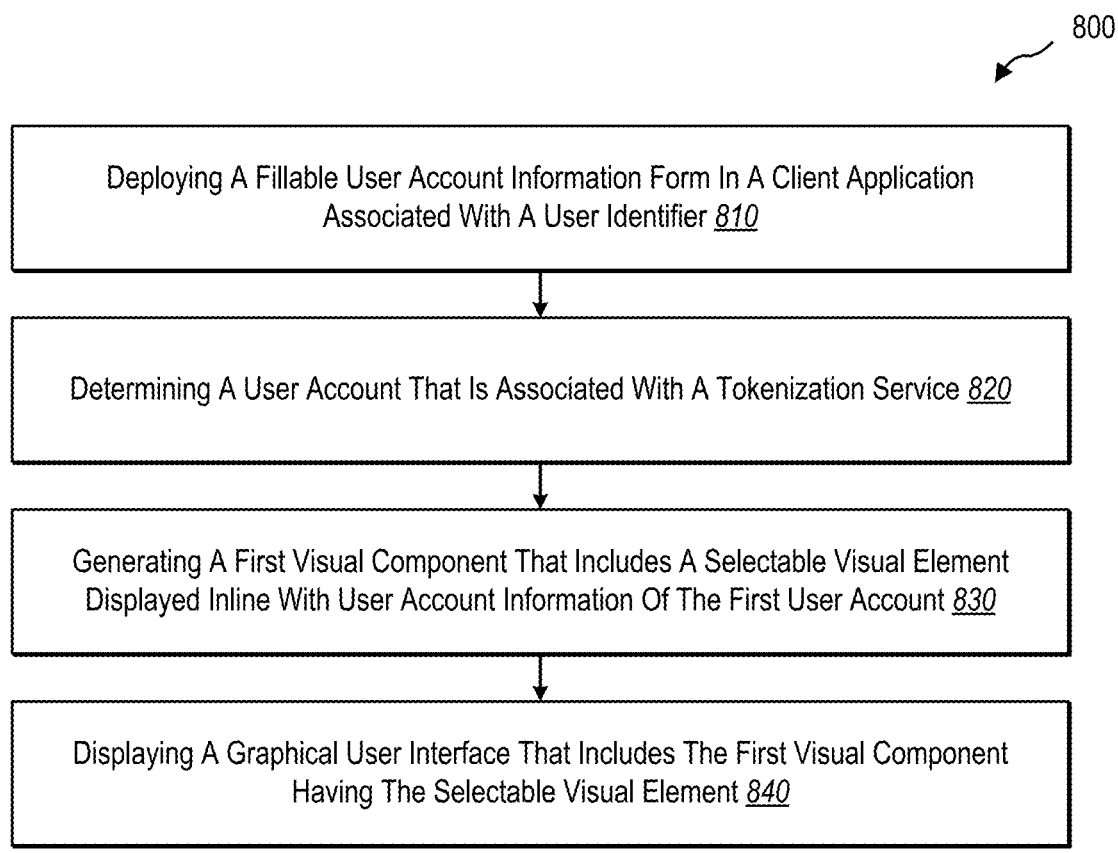
FIG. 8 illustrates an example series of acts for dynamically generating and displaying a selectable visual element integrated into a user interface in accordance with one or more implementations.
Figure 9:
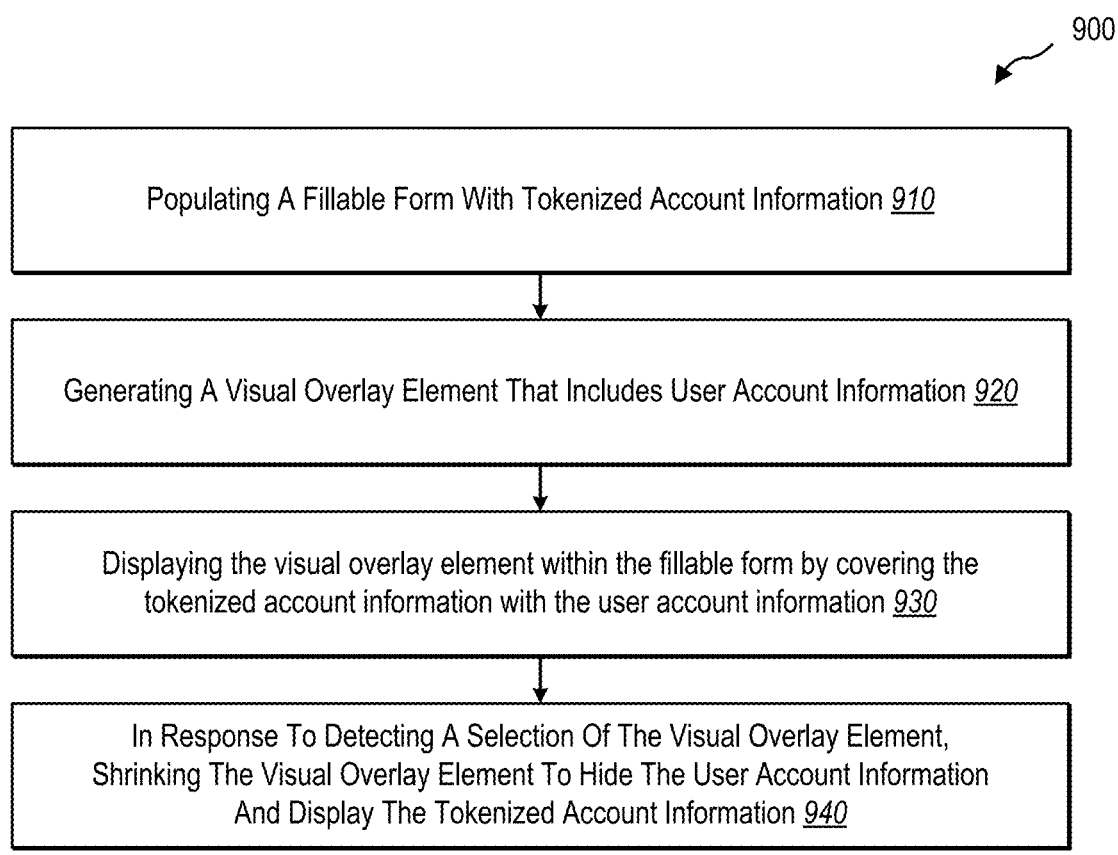
FIG. 9 illustrates an example series of acts for dynamically generating and displaying visual overlay elements integrated into a user interface in accordance with one or more implementations.

Turning now to FIG. 8 and FIG. 9, each of these figures illustrates an example flowchart that includes a series of acts for utilizing the dynamic visual elements system 104 in accordance with one or more implementations. While FIG. 8 and FIG. 9 each illustrate acts according to one or more implementations, alternative implementations may omit, add to, reorder, and/or modify any of the acts shown. Further, the acts of FIG. 8 and FIG. 9 can each be performed as part of a method. Alternatively, a non-transitory computer-readable medium can include instructions that, when executed by at least one processor, cause a computing device to perform the acts of FIG. 8 and FIG. 9. In still further implementations, a system can perform the acts of FIG. 8 and FIG. 9.

To illustrate, FIG. 8 shows an example series of acts 800 for dynamically generating and displaying a selectable visual element integrated into a user interface in accordance with one or more implementations. As shown, the series of acts 800 includes an act 810 of displaying a fillable user account form in a client application associated with a user identifier. For instance, the act 810 may involve detecting a client application displaying a fillable user account information form, wherein the client application is associated with a user identifier. In various implementations, the act 810 includes detecting the client application displaying the fillable user account information form by including the client application requesting user account information for the user identifier to populate the fillable user account information form.

As further shown, the series of acts 800 includes an act 820 of determining a user account that is associated with a tokenization service. For example, the act 820 may involve determining, in response to detecting the fillable user account information form, that a first user account of the user identifier is associated with an account tokenization service. In some implementations, the act 820 includes providing the user identifier to a user account information database or store that returns an indicator that the first user account is serviceable with the account tokenization service.

In various implementations, the act 820 also includes sending, from a client device having the client application and to a server device, a request for user account information associated with the user identifier, where the server device includes user account information for user identifiers; and receiving, from the server device and at the client device, response data including partial user account information for a first user account of the user identifier and a token indicator indicating that the first user account is associated with the account tokenization service.

In one or more implementations, the act 820 includes determining that the first user account is enrolled to utilize the account tokenization service and/or determining that the first user account is authorized to utilize the account tokenization service but has not enrolled to utilize the account tokenization service.

In various implementations, the act 820 includes determining tokenized user account information corresponding to the first user account from the account tokenization service. In some instances, generating the first visual component that includes the selectable visual element for utilizing the account tokenization service displayed inline with the partially revealed portion of the user account information also includes a portion of the tokenized user account information adjacent to the selectable visual element within the first visual component of the user account selection interface.

As further shown, the series of acts 800 includes an act 830 of generating a first visual component that includes a selectable visual element displayed inline with user account information of the first user account. For example, the act 830 may include generating, based on the first user account being associated with the account tokenization service, a first visual component that includes a selectable visual element for utilizing the account tokenization service displayed inline with a partially revealed portion of the user account information of the first user account.

In some implementations, the act 830 includes detecting, in response to displaying the graphical user interface (e.g., a user account selection interface), a selection of the first visual component, where the selectable visual element is deactivated upon detecting the selection of the first visual component; and based on detecting the selection of the first visual component with the selectable visual element set to inactive, populating the fillable user account information form with the partial user account information for the first user account.

In various implementations, the act 830 includes setting the selectable visual element to activate based on a predetermined setting when generating the first visual component. In certain implementations, the act 830 includes generating a graphic next to the selectable visual element for utilizing the account tokenization service. In one or more implementations, the act 830 includes displaying a graphical user interface in connection with the fillable user account information form, where the graphical user interface includes a first visual component that includes a selectable visual element for utilizing the account tokenization service displayed inline with a partially revealed portion of the user account information of the first user account.

As further shown, the series of acts 800 includes an act 840 of displaying a user interface that includes the first visual component having the selectable visual element. For example, the act 840 may involve displaying, as an overlay to the fillable user account information form, a graphical user interface that includes the first visual component having the selectable visual element displayed inline with the user account information of the first user account. In one or more implementations, the act 840 includes displaying, within the first visual component, the selectable visual element adjacent to the partially revealed portion of the user account information; and displaying, within a second visual component of the graphical user interface, user account information for a second user account of the user identifier, where the second visual component is visually separated from the first visual component.

In various implementations, the act 840 includes detecting, in response to displaying the graphical user interface, a selection of the first visual component, and based on detecting the selection of the first visual component with the selectable visual element set to active, populating the fillable user account information form with tokenized user account information corresponding to the first user account and provided by the account tokenization service. In one or more implementations, the act 840 includes detecting a selection of the first visual component with the first visual component being set to active and in response to detecting the selection of the first visual component, populating the fillable user account information form with tokenized user account information corresponding to the first user account and provided by the account tokenization service.

Continuing on, FIG. 9 illustrates an example series of acts for dynamically generating and displaying visual overlay elements integrated into a user interface in accordance with one or more implementations. As shown, the series of acts 900 includes an act 910 of populating a fillable form with tokenized account information. For instance, the act 910 may involve populating a fillable user account information form with tokenized user account information corresponding to a first user account and, in some instances, provided by an account tokenization service.

As further shown, the series of acts 900 includes an act 920 of generating a visual overlay element that includes user account information. For example, the act 920 may involve generating a visual overlay element that includes the partially revealed portion of the user account information of the first user account.

As further shown, the series of acts 900 includes an act 930 of displaying the visual overlay element within the fillable form by covering the tokenized account information with the user account information. For example, the act 930 may include displaying the visual overlay element within the fillable user account information form, where the visual overlay element covers the tokenized user account information to display the partially revealed portion of the user account information of the first user account.

In some implementations, the act 930 includes displaying a graphic (e.g., badge) within the visual overlay element in connection with displaying the partially revealed portion of the user account information of the first user account. In one or more implementations, the act 930 also includes detecting a selection of the visual overlay element and in response to detecting the selection of the visual overlay element, shrinking the visual overlay element to hide the partially revealed portion of the user account information of the user identifier and maintain display the graphic (e.g., badge). In some instances, shrinking the visual overlay element causes the tokenized user account information to become visible in the fillable user account information form.

In various implementations, the act 930 includes generating an additional visual overlay element that includes an additional partially revealed portion of the user account information of the first user account and displaying the additional visual overlay element within the fillable user account information form. In some instances, the additional visual overlay element covers an additional tokenized user account information displays the additional partially revealed portion of the user account information of the first user account.

In one or more implementations, the act 930 includes detecting a selection of the visual overlay element and in response to detecting the selection of the visual overlay element, 1) shrinking the visual overlay element to display the graphic causing the tokenized user account information to become visible in a first field of the fillable user account information form; and 2) shrinking the additional visual overlay element to display the graphic causing the additional tokenized user account information to become visible in a second field of the fillable user account information form.

As further shown, the series of acts 900 includes an act 940 of shrinking, in response to detecting a selection of the visual overlay element, the visual overlay element to cover, hide, or otherwise overlay the user account information and display the tokenized account information. For example, the act 940 may involve shrinking, modifying, reducing, diminishing, and/or decreasing, in response to detecting a selection of the visual overlay element, the visual overlay element to cover, hide, or otherwise overlay the partially revealed portion of the user account information of the first user account and maintain display of a graphic (e.g., badge). In various implementations, the act 940 includes shrinking the visual overlay element (e.g., switching to a different version of the visual overlay element that is smaller in size), which causes the tokenized user account information to become visible in the fillable user account information form.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the dynamic visual elements system 104. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by at least one processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 10:
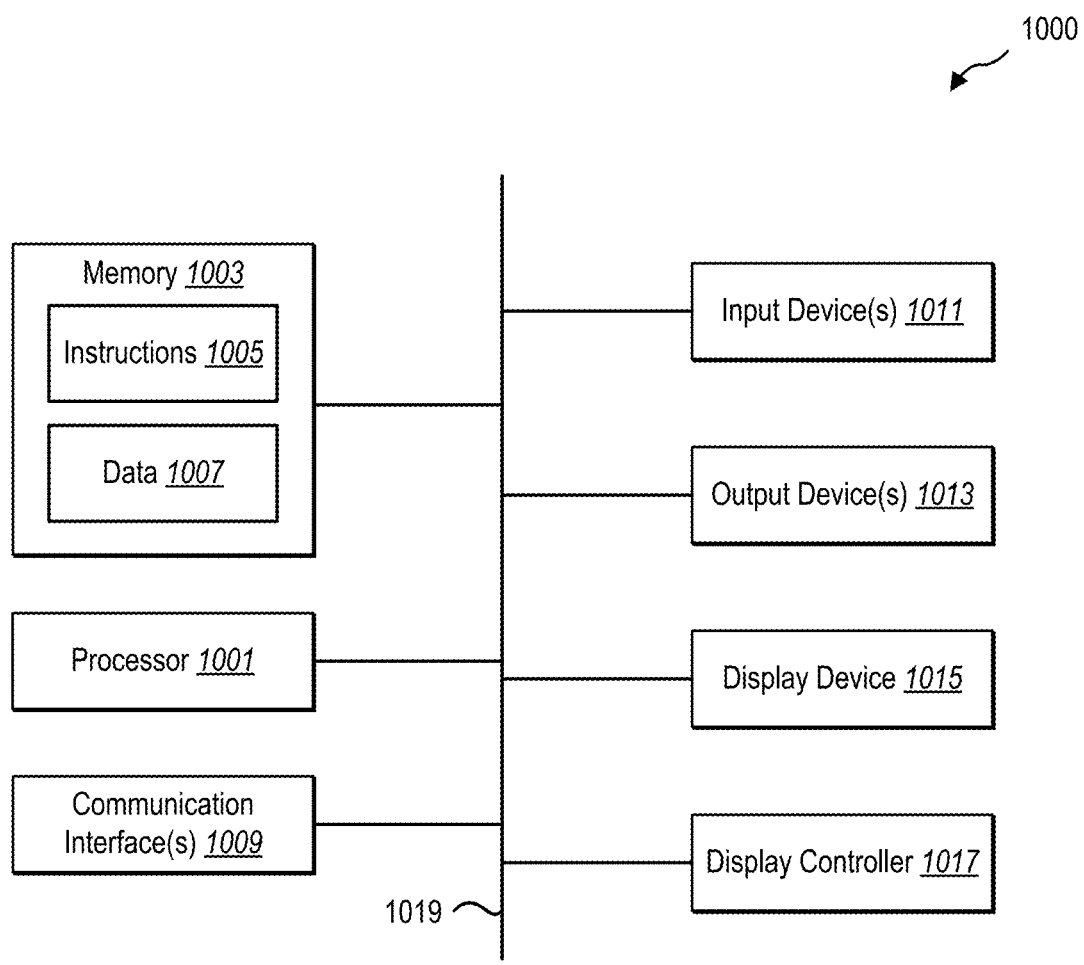
FIG. 10 illustrates certain components that may be included within a computer system.

FIG. 10 illustrates certain components that may be included within a computer system 1000. The computer system 1000 may be used to implement the various computing devices, components, and systems described herein.

In various implementations, the computer system 1000 may represent one or more of the client devices, server devices, or other computing devices described above. For example, the computer system 1000 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1000 includes a processor 1001 (i.e., at least one processor). The processor 1001 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 1001 may be referred to as a central processing unit (CPU). Although the processor 1001 shown is just a single processor in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 1005 and the data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during the execution of the instructions 1005 by the processor 1001.

A computer system 1000 may also include one or more communication interface(s) 1009 for communicating with other electronic devices. The one or more communication interface(s) 1009 may be based on wired communication technology, wireless communication technology, or both. Some examples of the one or more communication interface(s) 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computer system 1000 may also include one or more input device(s) 1011 and one or more output device(s) 1013. Some examples of the one or more input device(s) 1011 include a keyboard, mouse, microphone, remote control device, button, joystick, trackball, touchpad, and light pen. Some examples of the one or more output device(s) 1013 include a speaker and a printer. A specific type of output device that is typically included in a computer system 1000 is a display device 1015. The display device 1015 used with implementations disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method for dynamically generating and displaying one or more visual overlay elements integrated into a user interface, comprising:
    populating a fillable user account information form with tokenized user account information corresponding to user account information of a first user account;
    generating a visual overlay element that includes a partially revealed portion of the user account information of the first user account;
    causing display of the visual overlay element within the fillable user account information form, wherein the visual overlay element covers the tokenized user account information to display the partially revealed portion of the user account information of the first user account; and
    in response to detecting a selection of the visual overlay element, reducing the visual overlay element to cause the tokenized user account information to become fully visible in the fillable user account information form.

2. The computer-implemented method of claim 1, wherein causing the display of the visual overlay element within the fillable user account information form includes causing the display of a graphic within the visual overlay element in connection with displaying the partially revealed portion of the user account information of the first user account.

3. The computer-implemented method of claim 2, further comprising detecting the selection of the visual overlay element, wherein reducing the visual overlay element in response to detecting the selection of the visual overlay element includes:
    shrinking the visual overlay element to hide the partially revealed portion of the user account information to cause the tokenized user account information to become visible in the fillable user account information form; and
    maintaining the display the graphic.

4. The computer-implemented method of claim 2, further comprising:
    generating an additional visual overlay element that comprises an additional partially revealed portion of the user account information of the first user account; and
    causing display of the additional visual overlay element within a second field of the fillable user account information form, wherein the additional visual overlay element:
        covers an additional tokenized user account information in the second field of the fillable user account information form, and
        displays the additional partially revealed portion of the user account information of the first user account.

5. The computer-implemented method of claim 4, further comprising reducing the additional visual overlay element, in response to detecting the selection of the visual overlay element, to display the graphic, which causes the additional tokenized user account information to become visible in the second field of the fillable user account information form.

6. The computer-implemented method of claim 1, further comprising:
    in response to detecting the fillable user account information form, determining that the first user account is associated with an account tokenization service; and
    based on the first user account being associated with the account tokenization service, obtaining the tokenized user account information for the first user account from the account tokenization service.

7. The computer-implemented method of claim 1, wherein reducing the visual overlay element includes replacing the visual overlay element with a graphic located next to the tokenized user account information within the fillable user account information form.

8. The computer-implemented method of claim 7, wherein:
    the graphic is a badge or icon located within a first input field of the fillable user account information form; and
    the tokenized user account information is located adjacent to the graphic within the first input field of the fillable user account information form.

9. The computer-implemented method of claim 1, wherein reducing the visual overlay element includes hiding the visual overlay element from the fillable user account information form.

10. A system comprising:
    a processor; and
    a computer memory comprising instructions that, when executed by the processor, cause the system to carry out operations comprising:
        populating a fillable user account information form with tokenized user account information corresponding to user account information of a first user account;
        generating a visual overlay element that includes a partially revealed portion of the user account information of the first user account;
        causing display of the visual overlay element within the fillable user account information form, wherein the visual overlay element covers the tokenized user account information to display the partially revealed portion of the user account information of the first user account; and
        in response to detecting a selection of the visual overlay element, reducing the visual overlay element to cause the tokenized user account information to become fully visible in the fillable user account information form.

11. The system of claim 10, wherein reducing the visual overlay element includes replacing the visual overlay element with a graphic located next to the tokenized user account information within the fillable user account information form.

12. The system of claim 11, wherein:
    the graphic is a badge or icon located within a first input field of the fillable user account information form; and
    the tokenized user account information is located adjacent to the graphic within the first input field of the fillable user account information form.

13. The system of claim 10, wherein reducing the visual overlay element includes hiding the visual overlay element from the fillable user account information form.

14. The system of claim 10, wherein causing the display of the visual overlay element within the fillable user account information form includes causing the display of a graphic within the visual overlay element in connection with displaying the partially revealed portion of the user account information of the first user account.

15. The system of claim 14, further comprising instructions that, when executed by the processor, cause the system to carry out operations comprising:
detecting the selection of the visual overlay element, wherein reducing the visual overlay element in response to detecting the selection of the visual overlay element includes:
shrinking the visual overlay element to hide the partially revealed portion of the user account information to cause the tokenized user account information to become visible in the fillable user account information form; and
maintaining the display the graphic.

16. The system of claim 14, further comprising instructions that, when executed by the processor, cause the system to carry out operations comprising:
generating an additional visual overlay element that comprises an additional partially revealed portion of the user account information of the first user account; and
causing display of the additional visual overlay element within a second field of the fillable user account information form, wherein the additional visual overlay element:
covers an additional tokenized user account information in the second field of the fillable user account information form, and
displays the additional partially revealed portion of the user account information of the first user account.

17. The system of claim 16, further comprising instructions that, when executed by the processor, cause the system to carry out operations comprising reducing the additional visual overlay element, in response to detecting the selection of the visual overlay element, to display the graphic, which causes the additional tokenized user account information to become visible in the second field of the fillable user account information form.

18. A non-transitory computer-readable medium storing instructions that, when executed by a hardware processor, cause the hardware processor to carry out operations comprising:
populating a fillable user account information form with tokenized user account information corresponding to user account information of a first user account;
generating a visual overlay element that includes a partially revealed portion of the user account information of the first user account;
causing display of the visual overlay element within the fillable user account information form, wherein the visual overlay element covers the tokenized user account information to display the partially revealed portion of the user account information of the first user account; and
in response to detecting a selection of the visual overlay element, reducing the visual overlay element to cause the tokenized user account information to become fully visible in the fillable user account information form.

19. The non-transitory computer-readable medium of claim 18, wherein reducing the visual overlay element includes replacing the visual overlay element with a graphic located next to the tokenized user account information within the fillable user account information form.

20. The non-transitory computer-readable medium of claim 18, wherein reducing the visual overlay element includes hiding the visual overlay element from the fillable user account information form.

\* \* \* \* \*